US012684126B2

(12) United States Patent
Yuan et al.

(10) Patent No.: US 12,684,126 B2
(45) Date of Patent: *Jul. 14, 2026

(54) POINT CLOUD ENCODING METHOD AND DECODING METHOD, AND ENCODER AND DECODER

(71) Applicant: GUANGDONG OPPO MOBILE TELECOMMUNICATIONS CORP., LTD., Dongguan (CN)

(72) Inventors: Hui Yuan, Dongguan (CN); Xiaohui Wang, Dongguan (CN); Lu Wang, Dongguan (CN); Qi Liu, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 31 days.

This patent is subject to a terminal disclaimer.

(21) Appl. No.: 18/981,162

(22) Filed: Dec. 13, 2024

(65) Prior Publication Data

US 2025/0113032 A1 Apr. 3, 2025

Related U.S. Application Data

(63) Continuation of application No. 18/208,771, filed on Jun. 12, 2023, now Pat. No. 12,219,141, which is a
(Continued)

(51) Int. Cl.
*H04N 19/124* (2014.01)
*H04N 19/119* (2014.01)
(Continued)

(52) U.S. Cl.
CPC ......... *H04N 19/124* (2014.11); *H04N 19/119* (2014.11); *H04N 19/136* (2014.11); *H04N 19/50* (2014.11); *H04N 19/70* (2014.11)

(58) Field of Classification Search
CPC .. H04N 19/124; H04N 19/119; H04N 19/136; H04N 19/50; H04N 19/70;
(Continued)

(56) References Cited

U.S. PATENT DOCUMENTS 8,023,563 B2 * 9/2011 Vella ...................... H04N 19/94
                                                      375/240.22
10,762,667 B2 9/2020 Mekuria
(Continued)

FOREIGN PATENT DOCUMENTS

CA      3126760 A1    8/2020
CN    108322742 A     7/2018
(Continued)

OTHER PUBLICATIONS

First Office Action of the European application No. 20966332.7, issued on Nov. 17, 2025.
(Continued)

*Primary Examiner* — Tung T Vo
(74) *Attorney, Agent, or Firm* — BAYES PLLC

(57) ABSTRACT

Provided are a point cloud encoding method and decoding method, and an encoder and a decoder. The encoding method includes: processing attribute information of a target point in a point cloud, so as to obtain a predicted residual of the attribute information of the target point; quantizing the predicted residual on the basis of a quantized weight of the target point and a quantized stride of the target point, so as to obtain a quantized residual of the attribute information of the target point, wherein the quantized weight of the target point is the weight used when weighting the quantized stride of the target point; and encoding the quantized residual, so as to obtain a code stream.

18 Claims, 8 Drawing Sheets

Related U.S. Application Data continuation of application No. PCT/CN2020/138421, filed on Dec. 22, 2020.

(51) Int. Cl.
  H04N 19/136 (2014.01)
  H04N 19/50 (2014.01)
  H04N 19/70 (2014.01)
(58) Field of Classification Search
  CPC .. H04N 19/597; H04N 19/105; H04N 19/186; G06T 9/004; G06T 9/001; G06T 9/00
  USPC ..................................................... 375/240.03
  See application file for complete search history.

(56) References Cited

U.S. PATENT DOCUMENTS

| | | | |
|---|---|---|---|
| 10,861,196 | B2 | 12/2020 | Mammou |
| 10,904,564 | B2 | 1/2021 | Yea |
| 10,911,787 | B2 | 2/2021 | Tourapis |
| 11,202,054 | B2 * | 12/2021 | Yea ....................... H04N 19/105 |
| 11,568,571 | B2 * | 1/2023 | Yea .......................... G06T 17/00 |
| 2005/0141774 | A1 * | 6/2005 | Deever ................... H04N 19/17 375/E7.184 |
| 2007/0263720 | A1 | 11/2007 | He |
| 2018/0324426 | A1 * | 11/2018 | Huang ................. H04N 19/176 |
| 2018/0367802 | A1 * | 12/2018 | Han ................... H04N 21/6587 |
| 2019/0080483 | A1 | 3/2019 | Mammou et al. |
| 2020/0021844 | A1 * | 1/2020 | Yea ....................... H04N 19/124 |
| 2020/0021856 | A1 | 1/2020 | Tourapis et al. |
| 2020/0043199 | A1 | 2/2020 | Chang et al. |
| 2020/0090373 | A1 | 3/2020 | Graziosi |
| 2020/0105025 | A1 * | 4/2020 | Yea .......................... G06T 15/08 |
| 2020/0175725 | A1 | 6/2020 | Mekuria |
| 2020/0302651 | A1 * | 9/2020 | Flynn ........................ G06T 9/00 |
| 2020/0366932 | A1 | 11/2020 | Li et al. |
| 2021/0082153 | A1 | 3/2021 | Sugio |
| 2021/0084289 | A1 | 3/2021 | Sugio |
| 2021/0092355 | A1 | 3/2021 | Sugio |
| 2021/0104013 | A1 * | 4/2021 | Hur .......................... G06T 9/001 |
| 2021/0105458 | A1 * | 4/2021 | Sugio ........................ G06T 9/00 |
| 2021/0209811 | A1 * | 7/2021 | Ramasubramonian ..................... H04N 19/124 |
| 2021/0209812 | A1 * | 7/2021 | Han ....................... H04N 19/46 |
| 2021/0327097 | A1 * | 10/2021 | Ramasubramonian ..................... H04N 19/90 |
| 2021/0329298 | A1 * | 10/2021 | Ramasubramonian ..................... H04N 19/174 |
| 2021/0337202 | A1 * | 10/2021 | Xiu ....................... H04N 19/186 |
| 2021/0368186 | A1 | 11/2021 | Sugio |
| 2021/0400280 | A1 * | 12/2021 | Zaghetto .............. H04N 19/119 |
| 2021/0407142 | A1 * | 12/2021 | Hur ......................... H04N 19/30 |
| 2022/0028120 | A1 * | 1/2022 | Sugio ..................... H04N 19/63 |
| 2022/0108489 | A1 * | 4/2022 | Sugio ........................ G06T 9/00 |
| 2022/0159310 | A1 * | 5/2022 | Oh ............................ G06T 9/40 |
| 2022/0191520 | A1 * | 6/2022 | Kato ................... H04N 19/597 |
| 2022/0207782 | A1 * | 6/2022 | Iguchi ................. H04N 19/597 |
| 2022/0224941 | A1 * | 7/2022 | Sugio ................. H04N 19/136 |
| 2022/0239946 | A1 * | 7/2022 | Park ....................... H04N 19/60 |
| 2022/0264085 | A1 | 8/2022 | Galpin et al. |
| 2022/0286679 | A1 * | 9/2022 | Kuma ................. H04N 19/187 |
| 2022/0343548 | A1 * | 10/2022 | Park ................... H04N 21/4402 |
| 2022/0383552 | A1 * | 12/2022 | Hur ......................... G06T 9/00 |
| 2023/0046917 | A1 * | 2/2023 | Flynn ..................... H04N 19/96 |
| 2023/0047400 | A1 * | 2/2023 | Zhu ........................ H04N 19/42 |
| 2023/0059625 | A1 * | 2/2023 | Hur ........................ H04N 19/91 |
| 2023/0100085 | A1 * | 3/2023 | Sugio ..................... G06T 9/001 382/232 |
| 2023/0196625 | A1 * | 6/2023 | Li ........................... G06T 9/004 382/232 |
| 2023/0232004 | A1 * | 7/2023 | Yuan ................... H04N 19/157 375/240.03 |
| 2023/0316582 | A1 * | 10/2023 | Kuma ................. H04N 19/105 382/243 |
| 2023/0412837 | A1 * | 12/2023 | Oh ............................ G06T 9/00 |
| 2024/0015325 | A1 * | 1/2024 | Zhu ..................... H04N 19/597 |
| 2024/0037801 | A1 * | 2/2024 | Yuan ..................... H04N 19/12 |
| 2024/0233195 | A1 * | 7/2024 | Wang ..................... G06T 17/00 |

FOREIGN PATENT DOCUMENTS

| | | |
|---|---|---|
| CN | 109889840 A | 6/2019 |
| CN | 110708560 A | 1/2020 |
| CN | 111095929 A | 5/2020 |
| CN | 111247802 A | 6/2020 |
| CN | 111327897 A | 6/2020 |
| CN | 111327906 A | 6/2020 |
| CN | 111953998 A | 11/2020 |
| JP | 2018078503 A | 5/2018 |
| WO | 2019235366 A1 | 12/2019 |
| WO | 2019240215 A1 | 12/2019 |
| WO | 2019240284 A1 | 12/2019 |
| WO | 2020071414 A1 | 4/2020 |
| WO | 2020162495 A1 | 8/2020 |
| WO | 2020186060 A1 | 9/2020 |
| WO | 2020189709 A1 | 9/2020 |
| WO | 2020189976 A1 | 9/2020 |
| WO | 2020190093 A1 | 9/2020 |

OTHER PUBLICATIONS

International Search Report in the international application No. PCT/CN2020/117941, mailed on Jun. 23, 2021.
Written Opinion of the International Search Authority in the international application No. PCT/CN2020/117941, mailed on Jun. 23, 2021.
International Search Report in the international application No. PCT/CN2021/087064, mailed on Jul. 2, 2021.
Written Opinion of the International Search Authority in the international application No. PCT/CN2021/087064, mailed on Jul. 2, 2021.
International Search Report in the international application No. PCT/CN2020/138421, mailed on Sep. 7, 2021.
Written Opinion of the International Search Authority in the international application No. PCT/CN2020/138421, mailed on Sep. 7, 2021.
International Search Report in the international application No. PCT/CN2020/138423, mailed on Sep. 13, 2021.
Written Opinion of the International Search Authority in the international application No. PCT/CN2020/138423, mailed on Sep. 13, 2021.
Khaled Mammou et al: "Lifting Scheme for Lossy Attribute Encoding in TMC1", 122. MPEG Meeting; Apr. 16, 2018-Apr. 20, 2018; San Diego; (Motion Picture Expert Group or ISO/IEC JTC1/SC29/WG11), No. m42640, Apr. 11, 2018 (Apr. 11, 2018), XP030070979, the whole document, 9 pages.
Bappaditya Ray (Qualcomm) et al: "[G-PCC][ new] Attribute related high level syntax—fixes and improvements", 130. MPEG Meeting; Apr. 20, 2020-Apr. 24, 2020; Alpbach; (Motion Picture Expert Group or ISO/IEC JTC1/SC29/WG11), No. m53652, Apr. 15, 2020 (Apr. 15, 2020), XP030287312, the whole document, 18 pages.
Dean Han (Panasonic) et al: "[G-PCC] Delta QP for Layer of Lifting/Predicting Transform and RAHT", 126. MPEG Meeting; Mar. 25, 2019-Mar. 29, 2019; Geneva; (Motion Picture Expert Group or ISO/IEC JTC1/SC29/WG11), No. m47834, Mar. 22, 2019 (Mar. 22, 2019), XP030212138, the whole document, 5 pages.
Supplementary European Search Report in the European application No. 20966332.7, mailed on Sep. 20, 2023, 13 pages.
Sehoon Yea et al: "Lossless Scalable Lifting for Attribute Coding", 127. MPEG Meeting; Jul. 8, 2019-Jul. 12, 2019; Gothenburg; (Motion Picture Expert Groue or ISO/IEC JTC1/SC29/WG11), No. m49603, Jul. 9, 2019 (Jul. 9, 2019), XP030207983, the whole document, 6 pages.
Khaled Mammou et al:"G-PCC codec description v2", 125. MPEG Meeting; Jan. 14, 2019-Jan. 18, 2019; Marrakech; (Motion Picture

(56) References Cited

OTHER PUBLICATIONS

Expert Group or ISO/IEC JTC1/sc29/wG11), No. N18189, Feb. 22, 2019 (Feb. 22, 2019), XP030212734, pp. 26-34, sections 3.6-3.8, 39 pages.

Anonymous:"G-PCC codec description", International Organization for Ftandardization Organisation Internationale De Normalisation ISO/IEC JTC 1/SC 29/WG 7 MPEG 3D Graphics Coding, Oct. 1, 2020 (Oct. 1, 2020), XP055964154, p. 87, section d-p. 91, section c, p. 105, section f-p. 108, section e, 148 pages.

Liu Hao et al: "A Comprehensive Study and Comparison of Core Technologies for MPEG 3-D Point Cloud Compression" IEEE Transactions on Broadcasting, IEEE Service Center, Piscatanay, NJ, US, vol. 66, No. 3, Sep. 1, 2020 (Sep. 1, 2020), pp. 701-717, XP011807048, ISSN: 0018-9316, DOI:10.1109/TBC.2019. 2957652, sections Iii.C, IV and V, 17 pages.

Supplementary European Search Report in the European application No. 21870758.6, mailed on Feb. 16, 2024, 13 pages.

Non-Final Office Action of the U.S. Appl. No. 18/125,276, issued on Jun. 25, 2024, 50 pages.

First Office Action of the Japanese application No. 2023-538020, issued on Nov. 26, 2024, 8 pages with English translation.

First Office Action of the Korean application No. 10-2023-7024952, issued on Nov. 28, 2024, 9 pages with English translation.

Notice of Allowance of the U.S. Appl. No. 18/208,771, issued on Oct. 11, 2024, 56 pages.

Notice of Allowance of the U.S. Appl. No. 18/125,276, issued on Oct. 17, 2024, 20 pages.

First Office Action of the Indian application No. 202327046899, issued on Mar. 20, 2025, 7 pages with English translation.

First Office Action of the Japanese application No. 2023-518709, issued on May 20, 2025, 9 pages with English translation.

* cited by examiner

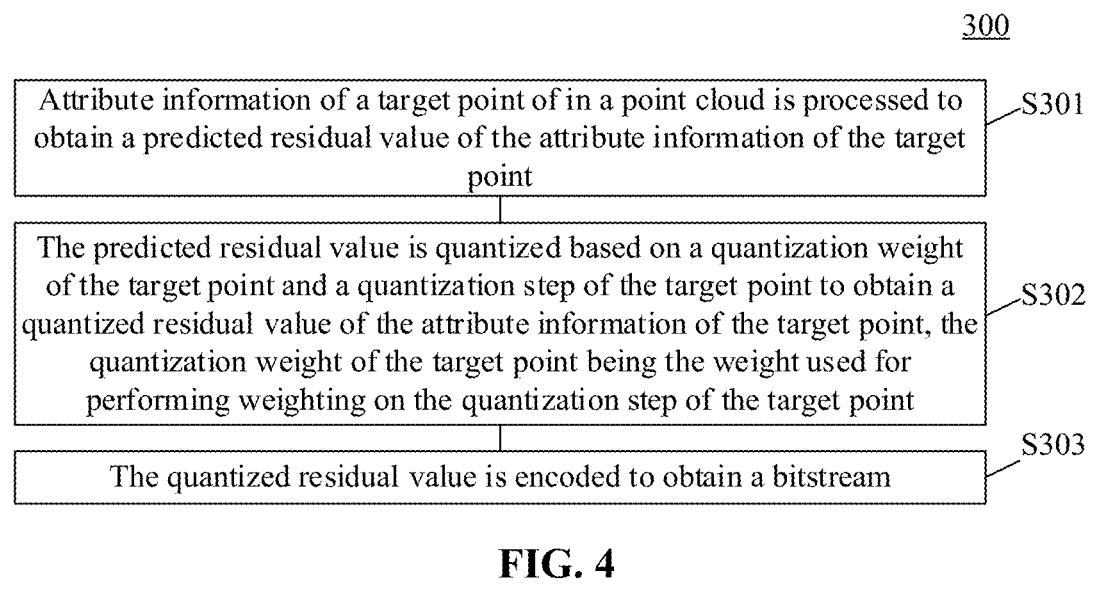

300

| Attribute information of a target point of in a point cloud is processed to obtain a predicted residual value of the attribute information of the target point | S301 |

| The predicted residual value is quantized based on a quantization weight of the target point and a quantization step of the target point to obtain a quantized residual value of the attribute information of the target point, the quantization weight of the target point being the weight used for performing weighting on the quantization step of the target point | S302 |

| The quantized residual value is encoded to obtain a bitstream | S303 |

FIG. 4

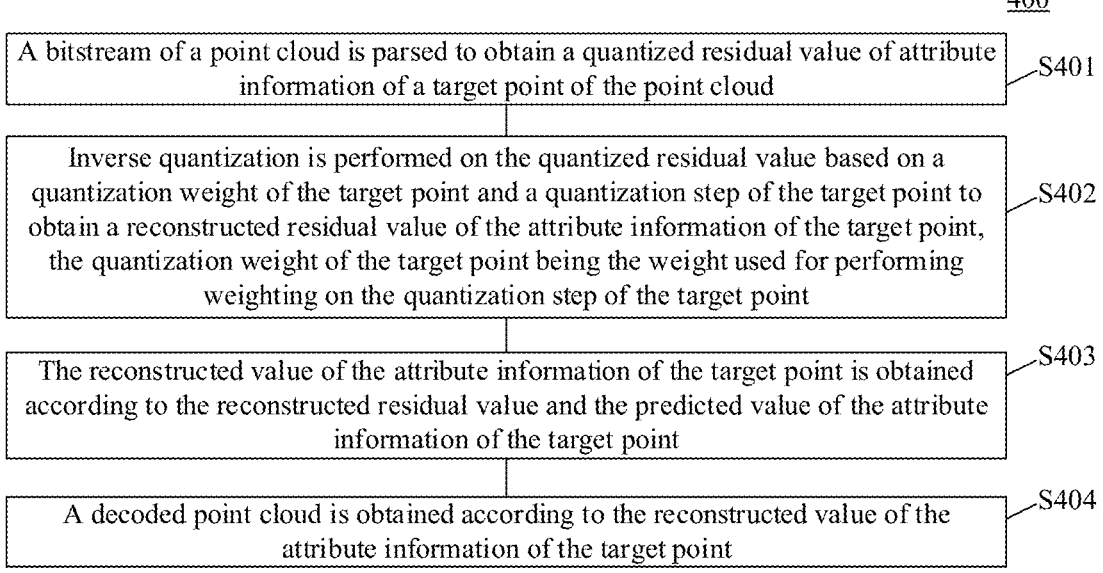

400

A bitstream of a point cloud is parsed to obtain a quantized residual value of attribute information of a target point of the point cloud ～S401

Inverse quantization is performed on the quantized residual value based on a quantization weight of the target point and a quantization step of the target point to obtain a reconstructed residual value of the attribute information of the target point, the quantization weight of the target point being the weight used for performing weighting on the quantization step of the target point ～S402

The reconstructed value of the attribute information of the target point is obtained according to the reconstructed residual value and the predicted value of the attribute information of the target point ～S403

A decoded point cloud is obtained according to the reconstructed value of the attribute information of the target point ～S404

FIG. 5

POINT CLOUD ENCODING METHOD AND DECODING METHOD, AND ENCODER AND DECODER

CROSS-REFERENCE TO RELATED APPLICATION

This application is a continuation application of U.S. patent application Ser. No. 18/208,771, filed on Jun. 12, 2023, entitled "POINT CLOUD ENCODING METHOD AND DECODING METHOD, AND ENCODER AND DECODER", which is a continuation application of International Patent Application No. PCT/CN2020/138421, filed on Dec. 22, 2020, entitled "POINT CLOUD ENCODING METHOD AND DECODING METHOD, AND ENCODER AND DECODER". The contents of all of the applications are incorporated herein by reference in their entireties.

BACKGROUND

Point clouds have begun to spread to various fields, such as virtual/augmented reality, robots, geographic information systems, medical fields, and the like. With the continuous improvement of the reference degree and the speed of scanning devices, a large number of point clouds on a surface of an object can be accurately acquired, and one scene may often correspond to hundreds of thousands of points in a scene. However, such a large number of points bring challenges to storage and transmission of a computer. Therefore, the compression of points has become a hot issue.

The compression of the point cloud data mainly includes the compression of location information and the compression of color information. Specifically, octree encoding is performed on location information of a point cloud first, meanwhile, color information of the point cloud is predicted according to the location information after the octree encoding, and then the color information is encoded in a manner of making a difference between the color information and original color information, so that the encoding of the point cloud is realized.

So far, how to improve a prediction effect is an urgent technical problem in this field in a process of predicting the color information.

SUMMARY

Embodiments of the disclosure relate to the field of cloud point encoding and decoding, and more particularly, to an encoding method, a decoding method, an encoder, and a decoder for a point cloud.

In an aspect, an encoding method for a point cloud is provided, which includes the following operations. Attribute information of a target point of in a point cloud is processed to obtain a predicted residual value of the attribute information of the target point. The predicted residual value is quantized based on a quantization weight of the target point and a quantization step of the target point to obtain a quantized residual value of the attribute information of the target point. The quantization weight of the target point is the weight used for performing weighting on the quantization step of the target point. The quantized residual value is encoded to obtain a bitstream.

In another aspect, a decoding method for a point cloud is provided, which includes the following operations. A bitstream of the point cloud is parsed to obtain a quantized residual value of attribute information of a target point of the point cloud. Inverse quantization is performed on the quantized residual value based on a quantization weight of the target point and a quantization step of the target point to obtain a reconstructed residual value of the attribute information of the target point. The quantization weight of the target point is the weight used for performing weighting on the quantization step of the target point. A reconstructed value of the attribute information of the target point is obtained according to a predicted residual value and a predicted value of the attribute information of the target point. A decoded point cloud is obtained according to the reconstructed value of the attribute information of the target point.

In another aspect, an encoder for a point cloud is provided, which includes a processor and a computer-readable storage medium for storing a computer program. The processor is configured to execute the computer program to: process attribute information of a target point in a point cloud to obtain a predicted residual value of the attribute information of the target point; quantize the quantized residual value based on a quantization weight of the target point and a quantization step of the target point to obtain a quantized residual value of the attribute information of the target point, the quantization weight of the target point being a weight used for performing weighting on the quantization step of the target point; and encode the quantized residual value to obtain a bitstream.

In another aspect, a decoder for a point cloud is provided, which includes a processor and a computer-readable storage medium for storing a computer program; wherein the processor is configured to execute the computer program to: parse a bitstream of a point cloud to obtain a quantized residual value of attribute information of a target point of the point cloud; perform inverse quantization on the quantized residual value based on a quantization weight of the target point and a quantization step of the target point to obtain a reconstructed residual value of the attribute information of the target point, the quantization weight of the target point being a weight used for performing weighting on the quantization step of the target point; obtain a reconstructed value of the attribute information of the target point according to the reconstructed residual value and a predicted value of the attribute information of the target point; and obtain a decoded point cloud according to the reconstructed value of the attribute information of the target point.

BRIEF DESCRIPTION OF THE DRAWINGS

FIG. 4 is a schematic flowchart of an encoding method provided by an embodiment of the disclosure.

FIG. 5 is a schematic flowchart diagram of a decoding method provided by an embodiment of the disclosure.

DETAILED DESCRIPTION

Figure 1:
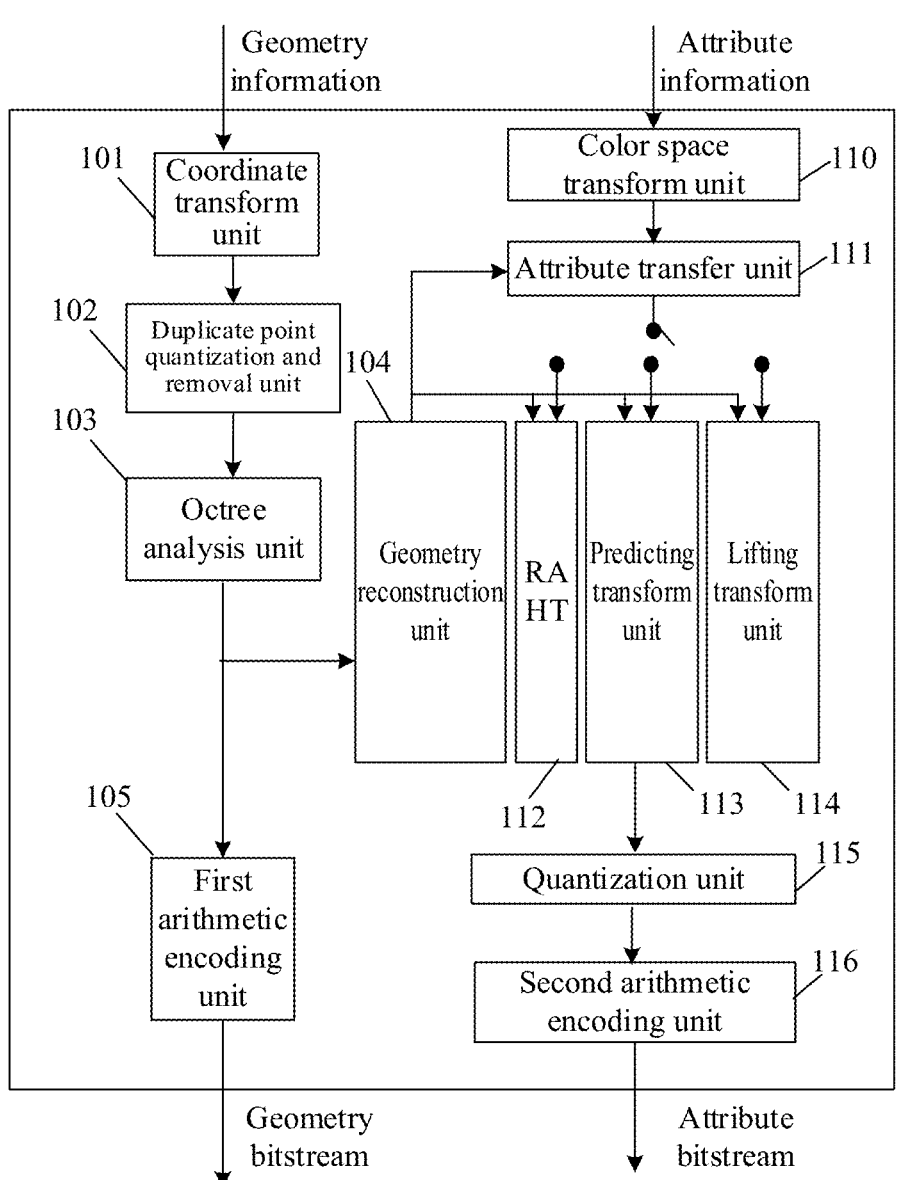
FIG. 1 is a schematic block diagram of encoding framework provided by an embodiment of the disclosure.

Concepts related to a point cloud are described below.

The point cloud refers to a group of randomly distributed discrete point sets that express a spatial structure and a surface attribute of a 3-Dimension (3D) object or a 3D scene in space.

Point cloud data is a specific record form of the point cloud. The point cloud data of each point in the point cloud may include geometry information and attribute information. The geometry information of each point in the point cloud refers to Cartesian 3D coordinate data. The attribute information of each point in the point cloud may include, but is not limited to, at least one of the following: color information, material information, and laser reflectance information. The color information may be the information in any color space. For example, the color information may be Red Green Blue (RGB) information. For another example, the color information may also be YcbCr (YUV) information. Y represents luma, Cb (U) represents blue chromatic aberration, Cr (V) represents red, and U and V represent chroma. The chroma is used for describing chromatic aberration information.

All points in the point cloud have the same amount of attribute information. For example, each point in the point cloud has two types of attribute information, namely, the color information and laser reflectance. For another example, each point in the point cloud has three types of attribute information, namely, the color information, the material information, and the laser reflectance information. In a process of encapsulating a point cloud medium, the geometry information of the point may also be referred to as a geometry composition or a geometry component, or the attribute information of the point may be referred to as an attribute composition or an attribute component of the point cloud medium. The point cloud medium may include one geometry component and one or more attribute component.

Point clouds may be divided into two types based on application scenes, that is, a machine perception point cloud and a human eye perception point cloud. An application scene of the machine perception point cloud includes, but is not limited to, point cloud application scenes such as an autonomous navigation system, a real-time inspection system, a geographic information system, a visual sorting robot, and a rescue robot. An application scene of the machine perception point cloud includes, but is not limited to, point cloud application scenes such as digital cultural heritage, free view broadcasting, 3D immersive communication, and 3D immersive interaction. Methods for acquiring the point cloud include, but are not limited to, computer generation, 3D laser scanning, 3D photogrammetry, and the like. The computer generation may generate a point cloud of a virtual 3D object and scene. The 3D scanning may obtain a point cloud of a 3D object or scene in a static real world, and millions of point clouds may be acquired per second. The 3D photogrammetry may obtain a point cloud of a 3D object or scene in a dynamic real world, and tens of millions of point clouds may be acquired per second. Specifically speaking, the point clouds on a surface of an object may be collected by collection devices such as photoelectric radar, laser radar, a laser scanner, and a multi-view camera. The point cloud obtained according to a laser measurement principle may include the 3D coordinate information of the point and laser reflectance of the point. The point cloud obtained according to a photogrammetry principle may include 3D coordinate information of the point and color information of the point. The point cloud obtained by combining the principles of laser measurement and photogrammetry may include the 3D coordinate information of the point, the laser reflectance of the point, and the color information of the point. Correspondingly, the point clouds may also be divided into three types of point clouds based on acquisition methods of the point clouds, namely, a type 1 static point cloud, type 2 dynamic point cloud, and type 3 dynamically acquired point cloud. For the type 1 static point cloud, an object is static, and a device for acquiring the point cloud is also static. For the type 2 dynamic point cloud, an object is moving, but the device for acquiring the point cloud is static. For the type 3 dynamically acquired point cloud, the device for acquiring the point cloud is moving.

For example, in the field of medicine, point clouds of biological tissues and organs may be obtained through Magnetic Resonance Imaging (MRI), Computed Tomography (CT), and electromagnetic positioning information. These technologies reduce the acquisition cost and the time period of the point cloud, and improve the accuracy of data. The transformation of the acquisition method for the point cloud makes it possible to acquire a large number of point clouds. With the continuous accumulation of large-scale point clouds, the efficient storage, transmission, distribution, sharing, and standardization of the point clouds have become the key to point cloud applications.

Point cloud data may be used for forming a point cloud medium, and the point cloud medium may be a medium file. The point cloud medium may include a plurality of medium frames, and each medium frame in the point cloud medium is composed of the point cloud data. The point cloud medium may flexibly and conveniently express a space structure and surface attribute of a 3D object or a 3D scene, so it is widely applied. After the point cloud medium is encoded, an encoded bitstream is encapsulated to from an encapsulation file, and the encapsulation file may be transmitted to a user. Correspondingly, at a point cloud medium player end, the encapsulation file needs to be de-encapsulated first and then is decoded, and finally, a decoded data stream is presented. The encapsulation file may also be referred to as a point cloud file.

So far, the point cloud may be encoded through point cloud encoding framework.

The point cloud encoding framework may be geometry-based Geometry Point Cloud Compression (G-PCC) encoding and decoding framework or video-based Video Point Cloud Compression (V-PCC) encoding and decoding framework provided by a Moving Picture Experts Group (MPEG), or may also be Audio Video Standard-Point Cloud Compression (AVS-PCC) encoding and decoding framework provided by an AVS. The G-PCC encoding and decoding framework may be configured to compress for the type 1 static point cloud and the type 3 dynamically acquired point cloud. The V-PCC encoding and decoding framework may be configured to compress for the type 2 dynamic point cloud. The G-PCC encoding and decoding framework is also referred to as a point cloud encoder/decoder TMC13. The V-PCC encoding and decoding framework is also referred to as a point cloud encoder/decoder TMC2. The encoding and decoding framework that is applicable to the embodiment of the disclosure is described below with reference to the G-PCC encoding and decoding framework.

FIG. 1 is a schematic block diagram of encoding framework 100 provided by an embodiment of the disclosure.

As shown in FIG. 1, the encoding framework 100 may acquire location information and attribute information of a point cloud from a collection device. The encoding of the point cloud includes location encoding and attribute encoding. In one embodiment, a location encoding process includes: preprocessing such as performing coordinate transformation on an original point cloud and quantizing and removing duplicate points; and a geometry bitstream is formed by encoding after an octree is constructed. An attribute encoding process includes: selecting one of three prediction modes to perform point cloud prediction by giving and inputting true values of reconstructed information and attribute information of the location information of the point cloud, quantizing predicted results, and performing arithmetic encoding to form an attribute bitstream.

As shown in FIG. 1, the location encoding may be implemented by the following units:

> a coordinate transform (Transform coordinates) unit 101, a duplicate point quantization and removal (Quantize and remove points) unit 102, an octree analysis (Analyze octree) unit 103, a geometry reconstruction (Reconstruct geometry) unit 104, and a first arithmetic encoding (Arithmetic encode) unit 105.

The coordinate transform unit 101 may be configured to transform world coordinates of a point in the point cloud into relative coordinates. For example, minimum values of xyz coordinate axes are subtracted from the geometry coordinates of the point respectively, which is equivalent to a DC removal operation, so as to transform the coordinates of the point in the point cloud from world coordinates to relative coordinates. The duplicate point quantization and removal unit 102 may reduce the number of coordinates by quantization. After the quantization, original different points may be endowed with the same coordinates. On this basis, duplicate points may be deleted through a de-duplication operation. For example, a plurality of clouds with the same quantization location and different attribute information may be merged into one cloud through attribute transform. In some embodiments of the disclosure, the duplicate point quantization and removal unit 102 may be an optional unit module. The octree analysis unit 103 may encode the location information of the quantized points in an octree encoding mode. For example, the point cloud is divided in the form of an octree. Therefore, the locations of the points may be in one-to-one correspondence with the locations of the octree. The locations where there are points in the octree are counted, and the flags of the locations are recorded as 1, so as to perform geometry encoding. The first arithmetic encoding unit 105 may perform arithmetic encoding on the location information output by the octree analysis unit 103 in an entropy encoding mode, that is, a geometry bitstream is generated by the location information output by the octree analysis unit 103 in an arithmetic encoding mode. The geometry bitstream is also referred to as a geometry bitstream.

The attribute encoding may be implemented by the following units:

> a color space transform (Transform colors) unit 110, an attribute transfer (Transfer attributes) unit 111, a Region Adaptive Hierarchical Transform (RAHT) unit 112, a predicting transform unit 113, a lifting transform unit 114, a quantization (Quantize) unit 115, and a second arithmetic encoding unit 116.

The color space transform unit 110 may be configured to transform the RGB color space of the point in the point cloud into a YCbCr format or other formats. The attribute transfer unit 111 may be configured to transform attribute information of the point in the point cloud to minimize attribute distortion. For example, the attribute transfer unit 111 may be configured to obtain a true value of the attribute information of the point. For example, the attribute information may be color information of the point. After the true value of the attribute information of the point is transferred by the attribute transfer unit 111, any predicting unit may be selected to predict the point in the point cloud. The unit configured to predict the point in the point cloud may include at least one of a RAHT 112, a predicting transform unit 113, and a lifting transform unit 114. In other words, any one of the RAHT 112, the predicting transform unit 113, and the lifting transform unit 114 may be configured to predict the attribute information of the point in the point cloud, so as to obtain a predicted value of the attribute information of the points, and to obtain a residual value of the attribute information of the point based on the predicted value of the attribute information of the point. For example, the residual value of the attribute information of the point may be obtained by subtracting the predicted value of the attribute information of the point from the true value of the attribute information of the point.

The predicting transform unit 113 may also be configured to generate a LOD, predict attribute information of points in the LOD in sequence, and calculate to obtain a predicted residual for subsequent quantization encoding. Specifically, for each point in the LOD, 3 nearest neighbor points are found in the LOD in front of the point, and then a present point is predicted by using reconstructed values of the 3 neighbor points to obtain a predicted value. On this basis, a residual value of the present point may be obtained based on the predicted value of the present point and the true value of the present point. For example, the residual value may be determined based on the following formula.

$$attrResidualQuant = (attrValue - attrPred)/Qstep$$

Herein, attrResidualQuant represents a residual value of the present point, attrPred represents a predicted value of the present point, attrValue represents a true value of the present point, and Qstep represents a quantization step. The Qstep is calculated by a Quantization Parameter (Qp).

The present point will be used as the nearest neighbor of a subsequent point, and attribute information of the subsequent point is predicted by using the reconstructed value of the present point. The reconstructed value of the attribute information of the present point may be obtained through the following formula.

$$reconstructedColor = attrResidualQuant \times Qstep + attrPred$$

Herein, the reconstructedColor represents a reconstructed value of the present point, attrResidualQuant represents a residual value of the present point, Qstep represents a quantization step, and attrPred represents a predicted value of the present point. The Qstep is calculated by a Quantization Parameter (Qp).

A process of generating the LOD includes: acquiring a Euclidean distance between points according to the location information of the points in the point cloud; and dividing the points into different LOD layers according to the Euclidean distance. In one embodiment, Euclidean distances in different ranges may be divided into different LOD layers after the Euclidean distances are sorted. For example, one point may be randomly selected to serve as a first LOD layer. Then, the Euclidean distances between the remaining points and the point are calculated, and the points with the Euclidean distances meeting a requirement of a first threshold value are grouped into a second LOD layer. A centroid of the point in the second LOD layer is acquired. The Euclidean distances between the points other than the first and second LOD layers and the centroid are calculated, and the points with the Euclidean distances meeting a requirement of a second threshold value are grouped into a third LOD layer. By analogy, all points are grouped into the LOD layer. The number of the points of each LOD layer may be gradually increased by adjusting the threshold value of the Euclidean distance. It is to be understood that the LOD may also be layer divided in other modes. No limits are made thereto in the disclosure. It is to be noted that, the point cloud may be directly divided into one or more LOD layers, or the point cloud may also be divided into a plurality of point cloud slices first, and then, each point cloud slice is divided into one or more LOD layers. For example, the point cloud is divided into a plurality of point cloud slices. The number of the points of each point cloud slice may range from 550,000 to 1100,000. Each point cloud slice may be regarded as a separate point cloud. Each point cloud slice may also be divided into a plurality of LOD layers. Each LOD layer includes a plurality of points. In one embodiment, the LOD layer may be divided according to the Euclidean distance between the points.

Figure 2:
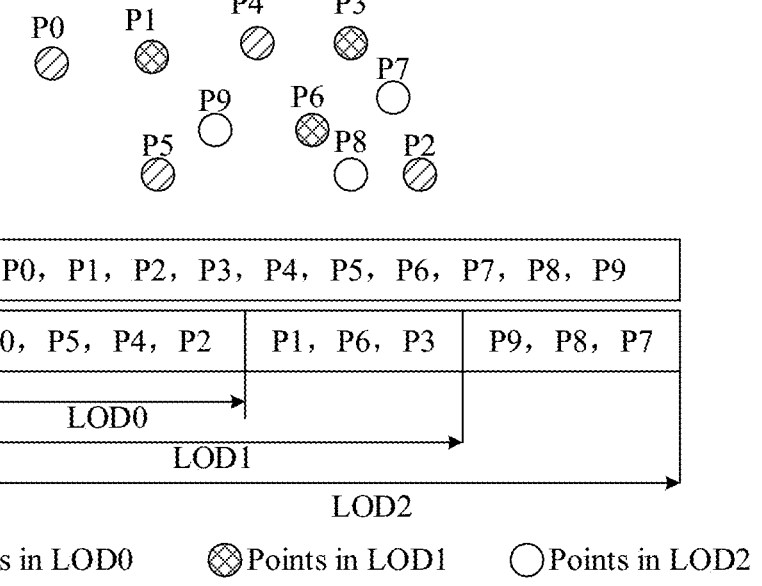
FIG. 2 is a schematic block diagram of a Level of Detail (LOD) layer provided by an embodiment of the disclosure.

FIG. 2 is a schematic block diagram of a LOD layer provided by an embodiment of the disclosure.

As shown in FIG. 2, it is assumed that the point cloud includes a plurality of points arranged in an original order, that is, P0, P1, P2, P3, P4, P5, P6, P7, P8, and P9, and it is assumed that the point cloud may be divided into three LOD layers, that is, LOD0, LOD1, and LOD2 based on the Euclidean distance between the points. LOD0 may include P0, P5, P4, and P2, LOD2 may include P1, P6, and P3, and LOD3 may include P9, P8, and P7. At this moment, LOD0, LOD1, and LOD2 may be configured to form a LOD-based order of the point cloud, that is, P0, P5, P4, P2, P1, P6, P3, P9, P8, and P7. The LOD-based order may be used as an encoding order of the point cloud.

The quantization unit 115 may be configured to quantize the residual value of the attribute information of the point. For example, if the quantization unit 115 is connected to the predicting transform unit 113, the quantization unit may be configured to quantize the residual values of the attribute information of the point output by the predicting transform unit 113. For example, the residual value of the attribute information of the point output by the predicting transform unit 113 is quantized by using a quantization step, so as to improve the system performance. The second arithmetic encoding unit 116 may perform entropy coding on the residual value of the attribute information of the point by using zero run length coding, so as to obtain an attribute bitstream. The attribute code may be bitstream information.

It is to be understood that, in the embodiment of the disclosure, the predicted value (predictedvalue) of the attribute information of the point in the point cloud may also be referred to as a predicted color (predictedColor) in a LOD mode. The residual value of the point may be obtained by subtracting the predicted value of the attribute information of the point from the true value of the attribute information of the point. The residual value of the attribute information of the point may also be referred to a residual color in the LOD mode. The reconstructed value (reconstructedvalue) of the attribute information of the point may be generated by adding the predicted value of the attribute information of the point and the residual value of the attribute information of the point. The reconstructed value of the attribute information of the point may also be referred to as a reconstructed color (reconstructedColor) in the LOD mode.

Figure 3:
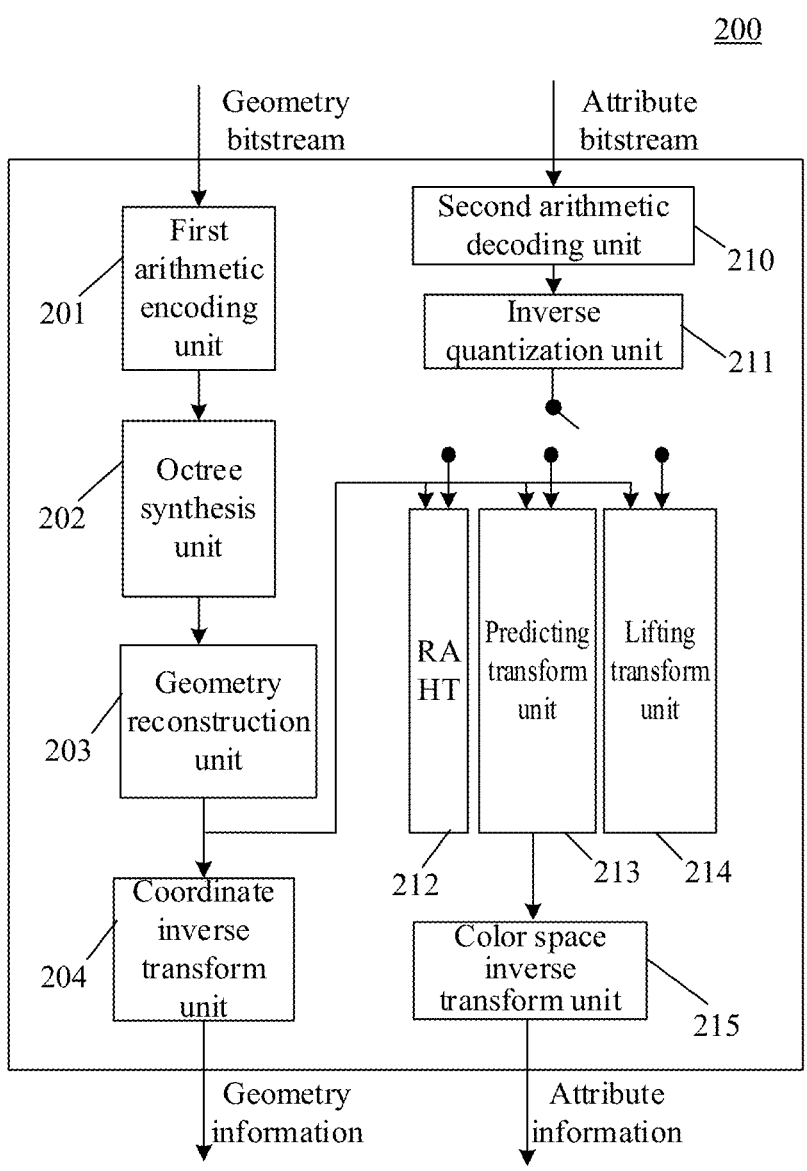
FIG. 3 is a schematic block diagram of decoding framework provided by an embodiment of the disclosure.

FIG. 3 is a schematic block diagram of decoding framework 200 provided by an embodiment of the disclosure.

As shown in FIG. 3, the decoding framework 200 may acquire a bitstream of a point cloud from an encoding device, and obtain location information and attribute information of the point in the point cloud by parsing the code. The decoding of the point cloud includes location decoding and attribute decoding.

In one embodiment, a process of location decoding includes: performing arithmetic decoding on the geometry bitstream; merging after constructing an octree, and reconstructing the location information of the point to obtain reconstructed information of the location information of the point; and performing coordinate transform on the reconstructed information of the location information of the point to obtain the location information of the point. The location information of the point may also be referred to as geometry information of the point.

A process of attribute decoding includes that: acquiring a residual value of the attribute information of the point in the point cloud by parsing an attribute bitstream; performing inverse quantization on the residual value of the attribute information of the point to obtain the residual value of the attribute information of the point after the inverse quantization; based on the reconstructed information of the location information of the point acquired in the process of location decoding, selecting one of the three prediction modes to perform point cloud predicting to obtain the reconstructed value of the attribute information of the point; and performing color space inverse transform on the reconstructed value of the attribute information of the point, so as to obtain a decoded point cloud.

As shown in FIG. 3, the location decoding may be implemented by the following units: a first arithmetic decoding unit 201, an octree synthesis (synthesize octree) unit 202, a geometry reconstruction (Reconstruct geometry) unit 203, and a coordinate inverse transform (inverse transform coordinates) unit 204. The attribute encoding may be implemented by the following units: a second arithmetic decoding unit 210, an inverse quantization unit 211, a RAHT unit 212, a predicting transform unit 213, a lifting transform unit 214, and a color space inverse transform (inverse transform colors) unit 215.

It is to be noted that the decompression is an inverse process of compression. Similarly, the functions of various units in the decoding framework 200 may refer o the functions of the corresponding unit in the encoding framework 100. For example, the decoder 200 may divide the point cloud into a plurality of LODs according to the Euclidean distance between the points in the point cloud, and then decode the attribute information of the points in the LODs in sequence, for example, counting the number of zeros (zero_cnt) in zero run length coding technology, and decoding a residual based on the number of zeros; and next, the decoding framework 200 may perform inverse quantization based on the decoded residual value, and add the residual value after the inverse quantization and the predicted value of the present point to obtain a reconstructed value of the point cloud until all point clouds are decoded. The present point will be used as the nearest neighbor of a point in the subsequent LOD, and attribute information of the subsequent point is predicted by using the reconstructed value of the present point. In addition, with regard to inverse transformation (transform) and inverse quantization (scale/scaling), for orthogonal transformation, if the one matrix is used for transformation, then the other matrix is used for inverse transformation. For a decoding method, a matrix used in the decoder is referred to as a transform matrix.

In the above encoding framework 100, the quantization unit 115 may quantize the predicted residual value of the attribute information of the point output by the predicting transform unit 113 by using the quantization step through a fixed quantization step technology or a variable quantization step technology. In the fixed quantization step technology, the predicted residual values of the points in all LODs are quantized by using a fixed quantization step. For the variable quantization step technology, an increment of a quantization parameter may be set for each layer of LOD to superpose the quantization parameter provided by an attribute parameter set based on a layered quantization technology of the LOD, so as to obtain an effective quantization parameter of the each layer of LOD. Specific increment settings of the quantization parameters are as shown in the following Table 1.

TABLE 1

| Increment setting table of quantization parameter Increment (Layer_QP_Delta) of layer quantization parameter | | | | | |
|---|---|---|---|---|---|
| LOD | R5 | R4 | R3 | R2 | R1 |
| 0 | −7 | −7 | −7 | −7 | −7 |
| 1 | −6 | −6 | −6 | −6 | −6 |
| 2 | −5 | −5 | −5 | −5 | −5 |
| 3 | −4 | −4 | −4 | −4 | −4 |
| 4 | −3 | −3 | −3 | −3 | −3 |
| 5 | −2 | −2 | −2 | −2 | −2 |
| 6 | −1 | −1 | −1 | −1 | −1 |
| 7 | 0 | 0 | 0 | 0 | 0 |
| 8 | 1 | 1 | 1 | 1 | 1 |
| 9 | 2 | 2 | 2 | 2 | 2 |
| 10 | 3 | 3 | 3 | 3 | 3 |
| 11 | 4 | 4 | 4 | 4 | 4 |
| 12 | 5 | 5 | 5 | 5 | 5 |
| 13 | 6 | 6 | 6 | 6 | 6 |
| 14 | 7 | 7 | 7 | 7 | 7 |

As shown in Table 2, LOD0 to LOD14 represent different LODs, R1 to R5 represent different rates, that is, different Quantization Parameters (Qps), the greater the value of Qp is, the higher the code rate is, R1 represents that the value of Qp is 10, R2 represents that the value of Qp is 16, the value of Qp is increased by 6 each time, R5 represents that the value of Qp is greater, that is, a quantization step is relatively large, the bitstream will become smaller, so the code rate is very low.

It can be seen through the above analysis that the accuracy of predicting by the fixed quantization step technology and the variable quantization step technology needs to be improved. In the fixed quantization step technology, the influence of the reconstructed value of the point in the previous LOD on prediction transformation of the point in a subsequent LOD when prediction transformation is performed on the point in the subsequent LOD by using the reconstructed value of the point in the previous LOD is not considered. If the quantization step of the several previous layers of LOD is large, a reconstruction error corresponding thereto is also large, which will lead to the transfer of the reconstruction error according to a prediction transformation technology of the attribute information of the point, thereby affecting a prediction effect of the point in the subsequent LOD, and reducing the accuracy of predicting. In addition, in the variable quantization step technology, the increment of the quantization parameter of each layer of LOD is set mechanically in a stepping mode without fully considering the characteristics of the number of layers of LOD and the number of points of each layer of LOD, and influence of the quality of the reconstructed values of the points of the several previous layers of LOD on the predicting effect of subsequent points is not considered, which leads to a large quantization step of the several previous layers of LOD, and cannot well consider the code rate and the encoding quality.

Embodiments of the disclosure relate an encoding method, a decoding method, an encoder, and a decoder for a point cloud, which can improve the accuracy of predicting attribution information of a point.

FIG. 4 is a schematic flowchart of an encoding method 300 for a point cloud according to an embodiment of the disclosure. The encoding method 300 may be performed by an encoder. For example, the encoding framework 100 as shown in FIG. 1 is a point cloud encoder TMC13. For the convenience of description, the technical solution of the disclosure is described below by taking the encoder as an execution subject.

As shown in FIG. 4, the encoding method 300 may include the following steps.

At S301, attribute information of a target point of in a point cloud is processed to obtain a predicted residual value of the attribute information of the target point.

At S302, the predicted residual value is quantized based on a quantization weight of the target point and a quantization step of the target point to obtain a quantized residual value of the attribute information of the target point. The quantization weight of the target point is the weight used for performing weighting on the quantization step of the target point.

At S303, the quantized residual value is encoded to obtain a bitstream.

In short, the encoder quantizes the predicted residual value based on the quantization weight of the target point and the quantization step of the target point to obtain a quantized residual value of the attribute information of the target point, and then encodes the quantized residual value to obtain the bitstream.

In a solution provided by the disclosure, the quantization weight used for performing weighting on the quantization step of the target point is introduced in a process of predicting the attribute information of the point in the point cloud, and the predicted residual value of the target point is quantized in combination with the quantization weight of the target point and the quantization step of the target point to obtain a quantized residual value of the attribute information of the target point, and then the quantized residual value is encoded to obtain a bitstream. The quantization weight of the target point is introduced, which is equivalent to modifying the quantization step of the target point based on the quantization weight of the target point, that is, the quantization step of the target point may be adaptively adjusted according to the importance degree of the target point, and then the predicted residual value of the target point is quantized based on the adjusted quantization step. In a process of predicting the attribute information of the point in the point cloud, for the point that is in front of an encoding order, when the point is relatively important in prediction, the quantization step of the point can be prevented from being too large, thereby avoiding a large reconstruction error, which is equivalent to that the point with a relatively high quantization weight is quantized with a small quantization step to reduce the reconstruction error thereof. For a point that is in the back of the encoding order, the accuracy of predicting the point can be improved, and the encoding effect can be improved.

Based on the technical solution provided by the disclosure, a test is performed on reference software TMC13 V11.0 of G-PCC. Part test sequence required by the MPEG is tested under the test condition of CTC CY. Test results are as shown in the following Table 2. The performance improving effect is described below with reference to Table 2.

TABLE 2

| Test sequence | Luma | Chroma (blue chromatic aberration) | Chroma (red chromatic aberration) |
|---|---|---|---|
| Type A point cloud sequence | −10.5% | −20.5% | −21.6% |
| Type B point cloud sequence | −4.3% | −10.9% | −11.5% |
| Average value of type A point cloud sequence and type B point cloud sequence | −7.2% | −15.5% | −16.3% |

As shown in Table 2, by adopting the solution of the embodiments of the disclosure, "−" represents the decrease of a Bjntegaard delta bit rate (BD-BitRate, BD-BR, or BDBR), BDBR represents the code rate difference under the same Peak Signal to Noise Ratio (PSNR), and the smaller the BDBR is, the better the performance of an encoding algorithm is. As shown in Table 2, the type A point cloud sequence represents a point cloud of the points including the color information and other attribute information of the points, and the type B point cloud sequence represents a point cloud of the points only including the color information of the points. The BDBR average value of the type A point cloud sequence and the type B point cloud sequence can objectively and realistically reflect that the performance of the encoding algorithm can be improved by introducing the quantization weight.

It is to be noted that, generally, the decrease of the code rate and the increase of the PSNR indicate that a new method has good performance. However, there will be such a case that the code rate is reduced compared with the original method, but the PSNR, that is, the quality of a video is reduced. In this case, the performance of the encoding algorithm may be measured by using the BDBR. Of course, in a video processing process, the performance of the encoding algorithm may also be measured by using other parameters, so as to characterize the changing situation of the video obtained by the new method and the video obtained by the original method in terms of code rate and PSNR. No specific limits are made thereto in the embodiments of the disclosure. For example, the performance of the encoding algorithm may also be measured by using Bjntegaard delta peak signal-to-noise rate (BD-PSNR or BD-PSNR). The BDPSNR represents the difference of the BDPSNR under the same code rate. The greater the BDPSNR is, the better the performance of the encoding algorithm is.

It is to be noted that, in the embodiments of the disclosure, the predicted value before quantizing the predicted residual value based on the quantization weight of the target point and the quantization step of the target point is referred to as a predicted residual value, and the predicted value after processing the predicted residual value based on the quantization weight of the target point and before processing the predicted residual value based on the quantization step of the target point is referred to as a weighted residual value, and the predicted value after quantizing the predicted residual value based on the quantization weight of the target point and the quantization step of the target point is referred to as a quantized residual value. Of course, the above naming mode is only an example of the disclosure, and is not to be understood as a limitation to the disclosure. In an alternative embodiment of the disclosure, the quantized residual value may also be referred to as the weighted quantized residual value, or even directly referred to as the residual value.

In some embodiments of the disclosure, the method 300 may further include the following operations.

An index of a target point is determined. A quantization weight corresponding to the index of the target point is determined as the quantization weight of the target point.

In short, the encoder may acquire the quantization weight of a point based on the index of the point.

Optionally, the quantization weights of the point cloud are saved as an array; and the dimension of the array is the same as the number of points in the point cloud. For example, QuantWeight[index] represents the quantization weight of a point index of index. At this moment, the QuantWeight[ ] may be understood as an array that stores the quantization weights of all points in the point cloud. The dimension of the array is the same as the number of points in the point cloud. The quantization weight of the point may be queried through the index of the point.

In some embodiments of the disclosure, the method 300 may further include the following operation.

The point cloud is divided into one or more LOD layers, and each LOD layer includes one or more points. An initial value of the quantization weight of a point in the previous M layers of LOD of the plurality of LOD layers is greater than an initial value of the quantization weight of a point in the remaining LOD layers of the plurality of LOD layers. M is an integer greater than 0. For example, the initial value of the quantization weight of each point in the previous seven LODs is set as 512, and the initial value of the quantization weight of each of the remaining LODs is set as 256.

In an implementation, quantization weights of N nearest points of the present point are updated based on the quantization weight of the present point by traversing the points in the point cloud according to a reverse order of the encoding order of the point cloud, and N is an integer greater than 0. For example, for the target point, the quantization weight of each of the N nearest points of the target point is updated based on the quantization weight of the target point, and N is an integer greater than 0. In an implementation, an influence weight of the present point on each of the N nearest points is acquired, and the influence weight depends on the location information of the present point and the N nearest points; and the quantization weights of the N nearest points are updated based on the quantization weight of the present point and the influence weight of the present point on each of the N nearest points. In an implementation, the attribute parameter set of the point cloud includes the influence weight of the present point on each of the N nearest points. The influence weight of the present point on each of the N nearest points is acquired by querying the attribute parameter set.

Optionally, the initial value of the quantization weight of each point in the point cloud is a preset value.

It is to be noted that limits are not made to a specific value of the initial value in the embodiments of the disclosure. As an example, the initial value may be 256, 512, or other specific values. Initializing to 256 means setting the values of the quantization weights of all points in the point cloud as 256.

After the encoder traverses each point in the point cloud in the reverse order, the quantization weight of each point will be updated according to the importance thereof in the process of predicting the attribute information of the points in the point cloud. The more important the point is, the greater the value of the quantization weight is.

In an implementation, the quantization weights of the N nearest points are updated based on the following formula.

$$newneighborQuantWeight[i] =$$
$$neighborQuantWeight[i] + (T[i] * QuantWeight[\text{index}-c]) \gg k$$

Herein, newneighborQuantWeight[i] represents a quantization weight of an ith nearest point after being updated based on the quantization weight of the present point, the neighborQuantWeight[i] represents a quantization weight of the ith nearest point before being updated based on the quantization weight of the present point, QuantWeight[index-c] represents the quantization weight of the present point, T[i] represents the influence weight of the present point on the ith nearest point, and k represents the number of bits of a right shift operation for T[i]*QuantWeight[index-c]. Optionally, the value of T[i] decreases with the increment of i.

For example, assuming that the initial values of the first quantization weights of all points in the point cloud are set as 256, and then all points are traversed in the reverse encoding order to update the quantization weights of three nearest points thereof. Assuming that the currently traversed point index is index, and the indexes of the three nearest points of the present point are indexN1, indexN2, and indexN3 respectively, then the quantization weights of the three nearest points of the present point may be recorded as:

neighborQuantWeight [0]=QuantWeight [indexN1];
neighborQuantWeight [1]=QuantWeight [indexN2];
neighborQuantWeight [2]=QuantWeight [indexN3].

The quantization weights of the three nearest points of the present point are updated by using the quantization weight thereof in the following modes:

$$newneighborQuantWeight[0] =$$
$$neighborQuantWeight[0] + (32 \times QuantWeight[\text{index}]) \gg k;$$
$$newneighborQuantWeight[1] = neighborQuantWeight[1] +$$
$$(16 \times QuantWeight[\text{index}]) \gg k;$$
$$newneighborQuantWeight[2] = neighborQuantWeight[2] +$$
$$(8 \times QuantWeight[\text{index}]) \gg k.$$

Herein, the value of k is 8. Herein, 32, 16, and 8 are respectively the influence weights of the present point on the first, second, and third nearest points. The influence weight may be defined in the attribute parameter set of the point cloud as syntax. That is, the value of the influence weight may be set through the attribute parameter set. The encoder may activate or access the attribute parameter set in the process of encoding the attribute information, and then call the value of the influence weight of the point from the attribute parameter set.>>represents a right shift operation. Of course, limits are not made to specific values of k and influence weights in the embodiments of the disclosure. The above numbers are only exemplary description, and are not to be interpreted as limitations to the disclosure. For example, in an alternative embodiment of the disclosure, the influence weights of the first, second, and third nearest points may also be respectively changed into 64, 32, and 16. Assuming that the quantization weight of the present point is 256, and the first quantization weight of the nearest point 0 (that is, the first nearest point) is 256, and the result of $(32\times256)\gg8$ is 32, that is, the operation result is shifted by 8 bits to the right. At this moment, the quantization weight of the nearest point 0 is updated to 256+32=288. This result may be saved in the array QuantWeight[ ] containing the quantization weights of all points of the point cloud at the same time. When the nearest point 0 is traversed, the three neighbors of the nearest point 0 are updated by using the quantization weight 288.

The syntax of the attribute parameter set is introduced below in combination with Table. 3.

TABLE 3

| Attribute parameter set |
|---|
| attribute_parameter_set( ) { |
| ... |
| aps_chroma_qp_offset |
| for( idx = 0; i < max_num_direct_predictors; i++){ |
| weightOfNearestNeighborsInAdaptiveQuant[i] |
| } |
| aps_slice_qp_deltas_present_flag |
| ... |
| } |

As shown in Table 3, attribute_parameter_set represents the attribute parameter set, aps_chroma_qp_offset represents chromatic aberration, weightOfNearestNeighborsInAdaptiveQuant[i] represents the influence weight of the present point on the ith nearest neighboring point, herein i is 0, 1, and 2 respectively representing the first, second, and third nearest points of the present point. Specifically speaking, the first nearest point represents the nearest neighboring point of the present point, the second nearest point represents the second nearest neighboring point of the present point, and so on.

In some embodiments of the disclosure, the S302 may include the following operations.

The effective quantization weight of the target point is determined based on the quantization weight of the target point; and the predicted residual value is quantized by using the effective quantization weight of the target point and the quantization step of the target point to obtain the quantized residual value.

Optionally, the effective quantization weight is less than or equal to the quantization step of the target point.

Optionally, the effective quantization weight of the target point is determined by using the following formula.

$$effectiveQuantWeight = \min([T3] \gg k, Qstep)$$

Herein, effectiveQuantWeight represents the effective quantization weight of the target point, QuantWeight[index] represents the quantization weight of the target point, k represents the number of digits for a right shift operation on the QuantWeight[index], and Qstep represents the quantization step of the target point.

In the embodiment of the disclosure, when the quantization step of the target point is set to be relatively small, the quantization weight of the target point may exceed the quantization step. At this moment, a smaller value of the quantization weight and the quantization step needs to be taken to obtain the effective quantization weight, so as to ensure that the encoder can perform a quantization operation on the predicted residual value, that is, to ensure the encoding performance of the encoder.

Optionally, the value of the effective quantization weight is equal to the integer power of 2.

Optionally, the value of the effective quantization weight is not equal to the integer power of 2; and the integer power of 2 which is the closest to the quantization weight of the target point is determined as the effective quantization weight based on the value of the quantization weight of the target point.

For example, assuming that the value of the quantization weight of the target point is 18, to facilitate the implementation of hardware, 18 may be transformed into the integer power of 2 which is the closest to it, that is, 16 or 32, for example, 18 is transformed into 16, that is, 18 is replaced with 16. Assuming that the value of the quantization weight of the target point is 30, the integer power of 2 which is the closest to it will become 32. At this moment, the quantization weight of the target point will be transformed into 32. For the integer power of 2, the function of adaptive quantization may be realized by a binary shift operation, which facilitates the implementation of the hardware.

In the embodiment of the disclosure, a weighted multiplication operation may be processed as a shift operation by constructing the value of the effective quantization weight as an integer power of 2, which can improve the processing efficiency of the encoder, thereby improving the performance of the encoder.

It is to be noted that, in other alternative embodiments of the disclosure, the minimum value of the quantization weight of the target point and the quantization step of the target point may be taken first, and then the integer power of 2 which is the closest to the minimum value may be determined as the effective quantization weight. Of course, the effective quantization weight may also be determined in other modes. No specific limits are made thereto in the embodiments of the disclosure. For example, the quantization weight of the target point may be directly determined as the effective quantization weight of the target point.

In some embodiments of the disclosure, the S302 may include the following operations.

The effective quantization weight is multiplied by the predicted residual value to obtain a weighted residual value; and the weighted residual value is quantized by using the quantization step of the target point to obtain the quantized residual value.

Specifically, an encoder may obtain a predicted value of the attribute information of the present point through predicting transform. The true value of the attribute information of the present point has been known, and then the predicted residual value of the attribute information of the present point may be obtained by subtracting the predicted value from the true value. The predicted residual value is multiplied by the effective quantization weight to obtain the weighted predicted residual value. The weighted predicted residual value, that is, the quantized residual value, may be obtained by quantizing the weighted predicted residual value by using the quantization step, and then, the quantized residual value of the present point is subjected to entropy encoding and is written into a bitstream.

Correspondingly, a decoder first calculates the quantization weight of each point in the point cloud according to the reconstructed location information, determines the effective quantization weight of each point by comparing with the target quantization step, then parses the bitstream to obtain the quantized residual value of the present point, performs inverse quantization to obtain the weighted predicted residual value, and divides the weighted predicted residual value by the effective quantization weight to obtain the predicted residual value. The decoder determines the predicted value of the attribute information of the present point through predicting transform, and then obtains the reconstructed value of the attribute information of the present point based on the predicted value and the predicted residual value of the attribute information of the present point. The decoder traverses the next point for decoding and reconstructing in order after obtaining the reconstructed value of the attribute information of the present point.

In conclusion, in the embodiment of the disclosure, the encoder performs weighting by multiplying the predicted residual value by the effective quantization weight before quantization. The decoder divides the weighted predicted residual value subjected to inverse quantization by the effective quantization weight to remove a weighted influence after inverse quantization, so as to obtain the predicted residual value. It is to be noted that, the quantization is not lossless, so the weighted predicted residual value obtained by the decoder is not necessarily equal to the weighted predicted residual value obtained by the encoder.

In some embodiments of the disclosure, the S302 may include the following operations.

The predicted residual value is quantized by using the following formula to obtain the quantized residual value.

$$attrResidualQuant2 = attrResidualQuant1 \times effectiveQuantWeight/Qstep$$

Herein, attrResidualQuant2 represents the quantized residual value, attrResidualQuant1 represents the predicted residual value, effectiveQuantWeight represents the effective quantization weight of the target point, and Qstep represents the quantization step of the target point.

In some embodiments of the disclosure, the S302 may include the following operations.

The quantization step of the target point is updated by using the following formula.

$$newQstep = \lceil Qstep/effectiveQuantWeight \rceil$$

Herein, effectiveQuantWeight represents the effective quantization weight of the target point, newQstep represents the quantization step of the target point after being updated based on the effective quantization weight of the target point, Qstep represents the quantization step of the target point before being updated based on the effective quantization weight of the target point, $\lceil \ \rceil$ represents a rounding up operation.

The predicted residual value is quantized by using the quantization step after being updated of the target point to obtain the quantized residual value.

In some embodiments of the disclosure, the S301 may include the following operations.

Location information of the target point is processed to obtain reconstructed information of the location information of the target point; a predicted value of the attribute information of the target point is obtained according to the reconstructed information of the location information of the target point; the attribute information of the target point in the point cloud is processed to obtain a true value of the attribute information of the target point; and the predicted residual value is obtained according to the predicted value of the attribute information of the target point and the true value of the attribute information of the target point.

The encoder processes the location information of a target point in the point cloud to obtain reconstructed information of the location information of the target point, obtains a predicted value of the attribute information of the target point according to the reconstructed information of the location information of the target point, processes the attribute information of the target point in the point cloud to obtain a true value of the attribute information of the target point, obtains the predicted residual value of the attribute information of the target point according to the predicted value of the attribute information of the target point and the true value of the attribute information of the target point, and obtains the bitstream based on the predicted residual value.

FIG. 5 is a schematic flowchart of a decoding method 400 for a point cloud according to an embodiment of the disclosure. The method 400 may be performed by a decoding end. For example, the decoding framework 200 shown in FIG. 3 is a point cloud decoder TMC13. For the convenience of description, the technical solution of the disclosure is described below by taking the decoder as an execution subject.

As shown in FIG. 5, the method 400 may include the following steps.

At S401, a bitstream of a point cloud is parsed to obtain a quantized residual value of attribute information of a target point of the point cloud.

At S402, inverse quantization is performed on the quantized residual value based on a quantization weight of the target point and a quantization step of the target point to obtain a reconstructed residual value of the attribute information of the target point. The quantization weight of the target point is the weight used for performing weighting on the quantization step of the target point.

At S403, the reconstructed value of the attribute information of the target point is obtained according to the reconstructed residual value and the predicted value of the attribute information of the target point.

At S404, a decoded point cloud is obtained according to the reconstructed value of the attribute information of the target point.

In some embodiments of the disclosure, the method 400 may further include the following operations.

An index of the target point is determined.

A quantization weight corresponding to the index of the target point is determined as the quantization weight of the target point.

In some embodiments of the disclosure, the S402 may include the following operations.

An effective quantization weight of the target point is determined based on the quantization weight of the target point.

Inverse quantization is performed on the quantized residual value by using the effective quantization weight of the target point and the quantization step of the target point to obtain the reconstructed residual value.

In some embodiments of the disclosure, the effective quantization weight is less than or equal to the quantization step of the target point.

In some embodiments of the disclosure, the effective quantization weight of the target point is determined by using the following formula.

$$effectiveQuantWeight = \min(QuantWeight[\text{index}] \gg k, Qstep)$$

Herein, effectiveQuantWeight represents the effective quantization weight of the target point, QuantWeight[index] represents the quantization weight of the target point, k represents the number of digits for a right shift operation on the QuantWeight[index], and Qstep represents the quantization step of the target point.

In some embodiments of the disclosure, the value of the effective quantization weight is equal to the integer power of 2.

In some embodiments of the disclosure, the value of the effective quantization weight is not equal to the integer power of 2, at this moment, the integer power of 2 which is the closest to the quantization weight of the target point may be determined as the effective quantization weight based on the value of the quantization weight of the target point.

In some embodiments of the disclosure, the S402 may include the following operations.

Inverse quantization is performed on the quantized residual value by using the quantization step of the target point to obtain a weighted residual value.

The weighted residual value is divided by the effective quantization weight to obtain the reconstructed residual value.

In some embodiments of the disclosure, the S402 may include the following operations.

Inverse quantization is performed on the quantized residual value by using the following formula to obtain the reconstructed residual value:

$$attrResidualQuant1 = (attrResidualQuant2 \times Qstep)/effectiveQuantWeight$$

Herein, attrResidualQuant2 represents the quantized residual value, attrResidualQuant1 represents the reconstructed residual value, effectiveQuantWeight represents the effective quantization weight of the target point, and Qstep represents the quantization step of the target point.

In some embodiments of the disclosure, the S402 may include the following operation.

The quantization step of the target point is updated by using the following formula.

$$newQstep = \lceil Qstep/effectiveQuantWeight \rceil$$

Herein, effectiveQuantWeight represents effective quantization weight of the target point, newQstep represents the quantization step of the target point after being updated based on the effective quantization weight of the target point, and Qstep represents the quantization step of the target point before being updated based on the effective quantization weight of the target point.

Inverse quantization is performed on the quantized residual value by using the quantization step after being updated of the target point to obtain the reconstructed residual value.

In some embodiments of the disclosure, the method 400 may further include the following operation.

The quantization weight of each of the N nearest points of the target point is updated based on the quantization weight of the target point, and N is an integer greater than 0.

In some embodiments of the disclosure, quantization weights of N nearest points of the present point are updated based on the quantization weight of the present point by traversing the points in the cloud point according to a reverse order of an encoding order of the point cloud, and N is an integer greater than 0.

In some embodiments of the disclosure, the initial value of the quantization weight of each point in the point cloud is a preset value.

In some embodiments of the disclosure, the method 400 may further include the following operation.

The point cloud is divided into one or more LOD layers, and each LOD layer includes one or more points.

An initial value of the quantization weight of a point in the previous M layers of LOD of the plurality of LOD layers is greater than an initial value of the quantization weight of a point in the remaining LOD layers of the plurality of LOD layers.

In some embodiments of the disclosure, an influence weight of the present point on each of the N nearest points is acquired, and the influence weight depends on the location information of the present point and the N nearest points; and the quantization weights of the N nearest points are updated based on the quantization weight of the present point and the influence weight of the present point on each of the N nearest points.

In some embodiments of the disclosure, the attribute parameter set of the point cloud includes the influence weight of the present point on each of the N nearest points. The influence weight of the present point on each of the N nearest points is acquired by querying the attribute parameter set.

In some embodiments of the disclosure, the quantization weights of the N nearest points are updated based on the following Formula.

$$newneighborQuantWeight[i] =$$

$$neighborQuantWeight[i] + (T[i] * QuantWeight[\text{index}-c]) \gg k$$

Herein, newneighborQuantWeight[i] represents a quantization weight of an ith nearest point after being updated based on the quantization weight of the present point, the neighborQuantWeight[i] represents a quantization weight of the ith nearest point before being updated based on the quantization weight of the present point, QuantWeight[index-c] represents the quantization weight of the present point, T[i] represents the influence weight of the present point on the ith nearest point, and k represents the number of bits of a right shift operation for T[i]*QuantWeight[index-c].

In some embodiments of the disclosure, the value of T[i] decreases with the increment of i.

In some embodiments of the disclosure, the quantization weights of the point cloud are saved as an array; and the dimension of the array is the same as the number of points in the point cloud.

In some embodiments of the disclosure, the method 400 may further include the following operations.

A bitstream is parsed to obtain reconstructed information of the location information of the target point; and a predicted value of the attribute information of the target point is obtained according to the reconstructed information of the location information of the target point.

The preferred implementations of the disclosure are described in detail above with reference to the accompanying drawings. However, the disclosure is not limited to specific details in the above implementations. Within the scope of the technical concept of the disclosure, a variety of simple variants of the technical solution of the disclosure can be carried out, and these simple variants belong to the scope of protection of the disclosure. For example, each specific technical feature described in the above specific implementations can be combined in any suitable way without contradiction. In order to avoid unnecessary repetition, the disclosure will not describe various possible combination modes separately. For another example, various different implementation modes of the disclosure can also be combined arbitrarily, which is also considered as the content disclosed in the disclosure as long as not violating the idea of the disclosure. It is also to be understood that, in various method embodiments of the disclosure, the sequence numbers of various processes above do not mean execution sequences. The execution sequences of various processes should be determined according to functions and internal logic of the processes, and should not be construed as any limitation on the implementation processes of the embodiments of the disclosure.

The encoder and the decoder for the point cloud provided by the embodiments of the disclosure are described below with reference to the accompanying drawings.

Figure 6:
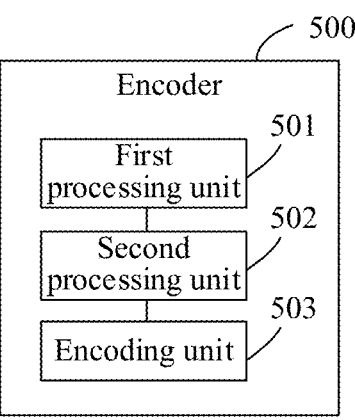
FIG. 6 is a schematic block diagram of an encoder provided by an embodiment of the disclosure.

FIG. 6 is a schematic block diagram of an encoder 500 for a point cloud provided by an embodiment of the disclosure.

As shown in FIG. 6, the encoder 500 may include a first processing unit 501, a second processing unit 502, and an encoding unit 503.

The first processing unit 501 is configured to process attribute information of a target point in a point cloud to obtain a predicted residual value of the attribute information of the target point.

The second processing unit 502 is configured to quantize the predicted residual value based on a quantization weight of the target point and a quantization step of the target point to obtain a quantized residual value of the attribute information of the target point. The quantization weight of the target point is the weight used for performing weighting on the quantization step of the target point.

The encoding unit 503 is configured to encode the quantized residual value to obtain a bitstream.

It is to be noted that the encoder 500 may also be combined to the encoding framework 100 shown in FIG. 1, that is, units in the encoder 500 may be replaced with or combined to related units in the encoding framework 100. For example, the first processing unit 501 may be configured to realize related functions of the predicting transform unit 113 in the encoding framework 100, and even to realize a location encoding function and functions before predicting for the attribute information. For another example, the second processing unit 502 may be used for replacing the quantization unit 115 in the encoding framework 100.

In some embodiments of the disclosure, the second processing unit 502 is further configured to:

determine an index of the target point; and determine a quantization weight corresponding to the index of the target point as the quantization weight of the target point.

In some embodiments of the disclosure, the second processing unit 502 is specifically configured to:

determine an effective quantization weight of the target point based on the quantization weight of the target point; and quantize the predicted residual value by using the effective quantization weight of the target point and the quantization step of the target point to obtain the quantized residual value.

In some embodiments of the disclosure, the effective quantization weight is less than or equal to the quantization step of the target point.

In some embodiments of the disclosure, the second processing unit 502 is specifically configured to:

determine the effective quantization weight of the target point by using the following formula:

$$effectiveQuantWeight = \min(QuantWeight[\text{index}] \gg k, Qstep)$$

Herein, effectiveQuantWeight represents the effective quantization weight of the target point, QuantWeight[index] represents the quantization weight of the target point, k represents the number of digits for a right shift operation on the QuantWeight[index], and Qstep represents the quantization step of the target point.

In some embodiments of the disclosure, the value of the effective quantization weight is equal to the integer power of 2.

In some embodiments of the disclosure, the value of the effective quantization weight is equal to the integer power of 2. The second processing unit 502 is specifically configured to:

determine the integer power of 2 which is the closest to the quantization weight of the target point as the effective quantization weight based on the value of the quantization weight of the target point.

In some embodiments of the disclosure, the second processing unit 502 is specifically configured to:

multiply the effective quantization weight by the predicted residual value to obtain a weighted residual value; and quantize the weighted residual value by using the quantization step of the target point to obtain the quantized residual value.

In some embodiments of the disclosure, the second processing unit 502 is specifically configured to:

quantize the predicted residual value by using the following formula to obtain the quantized residual value.

$$attrResidualQuant2 = attrResidualQuant1 \times effectiveQuantWeight/Qstep,$$

Herein, attrResidualQuant2 represents the quantized residual value, attrResidualQuant1 represents the predicted residual value, effectiveQuantWeight represents the effective quantization weight of the target point, and Qstep represents the quantization step of the target point.

In some embodiments of the disclosure, the second processing unit 502 is specifically configured to:

update the quantization step of the target point by using the following formula:

$$newQstep = \lceil Qstep/effectiveQuantWeight \rceil,$$

herein, effectiveQuantWeight represents effective quantization weight of the target point, newQstep represents the quantization step of the target point after being updated based on the effective quantization weight of the target point, and Qstep represents the quantization step of the target point before being updated based on the effective quantization weight of the target point; and quantize the predicted residual value by using the quantization step after being updated of the target point to obtain the quantized residual value.

In some embodiments of the disclosure, the second processing unit 502 is further configured to:

update quantization weights of N nearest points of the present point based on the quantization weight of the present point by traversing the points in the cloud point according to a reverse order of an encoding order of the point cloud, N being an integer greater than 0.

In some embodiments of the disclosure, the initial value of the quantization weight of each point in the point cloud is a preset value.

In some embodiments of the disclosure, the first processing unit 501 is further configured to:

divide the point cloud into one or more LOD layers, and each LOD layer includes one or more points.

An initial value of the quantization weight of a point in the previous M layers of LOD of the plurality of LOD layers is greater than an initial value of the quantization weight of a point in the remaining LOD layers of the plurality of LOD layers.

In some embodiments of the disclosure, the second processing unit 502 is specifically configured to:

acquire an influence weight of the present point on each of the N nearest points, the influence weight depending on location information of the present point and the N nearest points; and update the quantization weights of the N nearest points based on the quantization weight of the present point and the influence weight of the present point on each of the N nearest points.

In some embodiments, the attribute parameter set of the point cloud includes the influence weight of the present point on each of the N nearest points. The quantization unit 502 is specifically configured to:

acquire the influence weight of the present point on each of the N nearest points by querying the attribute parameter set.

In some embodiments of the disclosure, the second processing unit 502 is specifically configured to:

update the quantization weights of the N nearest points based on the following formula:

$$newneighborQuantWeight[i] =$$
$$neighborQuantWeight[i] + (T[i] * QuantWeight[\text{index}-c]) \gg k$$

Herein, newneighborQuantWeight[i] represents a quantization weight of an ith nearest point after being updated based on the quantization weight of the present point, the neighborQuantWeight[i] represents a quantization weight of the ith nearest point before being updated based on the quantization weight of the present point, QuantWeight[index-c] represents the quantization weight of the present point, T[i] represents the influence weight of the present point on the ith nearest point, and k represents the number of bits of a right shift operation for T[i]*QuantWeigh[index-c].

In some embodiments of the disclosure, the value of T[i] decreases with the increment of i.

In some embodiments of the disclosure, the quantization weights of the point cloud are saved as an array; and the dimension of the array is the same as the number of points in the point cloud.

In some embodiments of the disclosure, the first processing unit 501 is specifically configured to:

process location information of the target point to obtain reconstructed information of the location information of the target point;

obtain a predicted value of the attribute information of the target point according to the reconstructed information of the location information of the target point;

process the attribute information of the target point in the point cloud to obtain a true value of the attribute information of the target point; and obtain the predicted residual value according to the predicted value of the attribute information of the target point and the true value of the attribute information of the target point.

Figure 7:
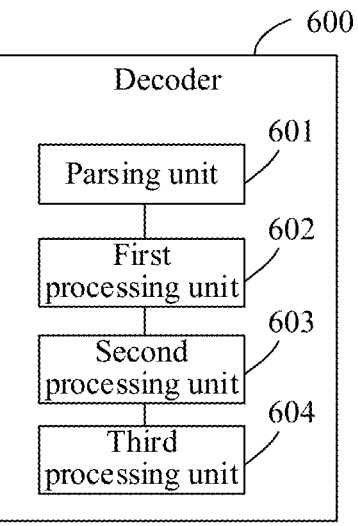
FIG. 7 is a schematic block diagram of a decoder provided by an embodiment of the disclosure.

FIG. 7 is a schematic block diagram of a point cloud decoder 600 provided by an embodiment of the disclosure.

As shown in FIG. 7, the decoder 600 may include a parsing unit 601, a first processing unit 602, a second processing unit 603, and a third processing unit 604.

The parsing unit 601 is configured to parse a bitstream of the point cloud to obtain a quantized residual value of attribute information of a target point of the point cloud.

The first processing unit 602 is configured to perform inverse quantization on the quantized residual value based on the quantization weight of the target point and the quantization step of the target point to obtain a reconstructed residual value of the attribute information of the target point. The quantization weight of the target point is the weight used for performing weighting on the quantization step of the target point.

The second processing unit 603 is configured to obtain the reconstructed value of the attribute information of the target point according to the reconstructed residual value and the predicted value of the attribute information of the target point; and The third processing unit 604 is configured to obtain a decoded point cloud according to the reconstructed value of the attribute information of the target point.

It is to be noted that the decoder 600 may also be combined to the decoding framework 200 shown in FIG. 3, that is, units in the decoder 600 may be replaced with or combined to related units in the decoding framework 200. For example, the parsing unit 601 may be configured to realize related functions of a predicting transform unit 213 in the decoding framework 200, and even to realize a location decoding function and functions of a second arithmetic decoding unit 210. For another example, the first processing unit 602 and the second processing unit 603 may be configured to replace an inverse quantization unit 211 in the decoding framework 200. For another example, the third processing unit 604 may be configured to replace the functions of a color space inverse transform unit 215 in the decoding framework 200.

In some embodiments of the disclosure, the first processing unit 602 is further configured to:

determine an index of the target point; and determine a quantization weight corresponding to the index of the target point as the quantization weight of the target point.

In some embodiments of the disclosure, the first processing unit 602 is specifically configured to:

determine an effective quantization weight of the target point based on the quantization weight of the target point; and Inverse quantization is performed on the quantized residual value by using the effective quantization weight of the target point and the quantization step of the target point to obtain the reconstructed residual value.

In some embodiments of the disclosure, the effective quantization weight is less than or equal to the quantization step of the target point.

In some embodiments of the disclosure, the value of the effective quantization weight is equal to the integer power of 2.

In some embodiments of the disclosure, the value of the effective quantization weight is equal to the integer power of 2. The first processing unit 602 is configured to:

determine the integer power of 2 which is the closest to the quantization weight of the target point as the effective quantization weight based on the value of the quantization weight of the target point.

In some embodiments of the disclosure, the first processing unit 602 is specifically configured to:

determine the effective quantization weight of the target point by using the following formula:

$$effectiveQuantWeight = \min(QuantWeight[\text{index}] \gg k, Qstep)$$

Herein, effectiveQuantWeight represents the effective quantization weight of the target point, QuantWeigh[index] represents the quantization weight of the target point, k represents the number of digits for a right shift operation on the QuantWeight[index], and Qstep represents the quantization step of the target point.

In some embodiments of the disclosure, the first processing unit 602 is specifically configured to:

perform inverse quantization on the quantized residual value by using the quantization step of the target point to obtain a weighted residual value; and divide the weighted residual value by the effective quantization weight to obtain the reconstructed residual value.

In some embodiments of the disclosure, the first processing unit 602 is specifically configured to:

perform inverse quantization on the quantized residual value by using the following formula to obtain the reconstructed residual value:

$$attrResidualQuant1 = (attrResidualQuant2 \times Qstep)/effectiveQuantWeight.$$

Herein, attrResidualQuant2 represents the quantized residual value, attrResidualQuant1 represents the reconstructed residual value, effectiveQuantWeight represents the effective quantization weight of the target point, and Qstep represents the quantization step of the target point.

In some embodiments of the disclosure, the first processing unit 602 is specifically configured to:

update the quantization step of the target point by using the following formula:

$$newQstep = \lceil Qstep/effectiveQuantWeight \rceil,$$

herein, effectiveQuantWeight represents effective quantization weight of the target point, newQstep represents the quantization step of the target point after being updated based on the effective quantization weight of the target point, and Qstep represents the quantization step of the target point before being updated based on the effective quantization weight of the target point; and perform inverse quantization on the quantized residual value by using the quantization step after being updated of the target point to obtain the reconstructed residual value.

In some embodiments of the disclosure, the first processing unit 602 is further configured to:

update the quantization weight of each of the N nearest points of the target point based on the quantization weight of the target point, and N is an integer greater than 0.

In some embodiments of the disclosure, the first processing unit 602 is specifically configured to:

update quantization weights of N nearest points of the present point based on the quantization weight of the present point by traversing the points in the cloud point according to a reverse order of an encoding order of the point cloud, N being an integer greater than 0.

In some embodiments of the disclosure, the initial value of the quantization weight of each point in the point cloud is a preset value.

In some embodiments of the disclosure, the second processing unit 603 is specifically configured to:

divide the point cloud into one or more LOD layers, and each LOD layer includes one or more points.

An initial value of the quantization weight of a point in the previous M layers of LOD of the plurality of LOD layers is greater than an initial value of the quantization weight of a point in the remaining LOD layers of the plurality of LOD layers.

In some embodiments of the disclosure, the first processing unit 602 is specifically configured to:

acquire an influence weight of the present point on each of the N nearest points, the influence weight depending on location information of the present point and the N nearest points; and update the quantization weights of the N nearest points based on the quantization weight of the present point and the influence weight of the present point on each of the N nearest points.

In some embodiments, the attribute parameter set of the point cloud includes the influence weight of the present point on each of the N nearest points. The quantization unit 602 is specifically configured to:

acquire the influence weight of the present point on each of the N nearest points by querying the attribute parameter set.

In some embodiments of the disclosure, the first processing unit 602 is specifically configured to:

update the quantization weights of the N nearest points based on the following formula:

$$newneighborQuantWeight[i] =$$
$$neighborQuantWeight[i] + \left(T[i] * QuantWeight[index-c]\right) \gg k.$$

Herein, newneighborQuantWeight[i] represents a quantization weight of an ith nearest point after being updated based on the quantization weight of the present point, the neighborQuantWeight[i] represents a quantization weight of the ith nearest point before being updated based on the quantization weight of the present point, QuantWeight[index-c] represents the quantization weight of the present point, T[i] represents the influence weight of the present point on the ith nearest point, and k represents the number of bits of a right shift operation for T[i]*QuantWeight[index-c].

In some embodiments of the disclosure, the value of T[i] decreases with the increment of i.

In some embodiments of the disclosure, the quantization weights of the point cloud are saved as an array; and the dimension of the array is the same as the number of points in the point cloud.

In some embodiments of the disclosure, the first processing unit 601 is specifically configured to:

parse a bitstream to obtain reconstructed information of the location information of the target point; and obtain a predicted value of the attribute information of the target point according to the reconstructed information of the location information of the target point.

It is to be understood that the apparatus embodiments may correspond to the method embodiments. Similar description may refer to the method embodiments. To avoid repetition, details are not elaborated herein. Specifically, the encoder 500 may correspond to corresponding subjects for implementing the method 300 of the embodiments of the disclosure, and various units in the encoder 500 are configured to implement the corresponding processes in the method 300, respectively. Similarly, the decoder 600 may correspond to corresponding subjects for implementing the method 400 of the embodiments of the disclosure, and various units in the decoder 600 are configured to implement the corresponding processes in the method 400, respectively. For simplicity, details are not elaborated herein.

It is also understood that various units in the encoder or decoder involved in the embodiments of the disclosure may be separately or completely combined into one or a plurality of additional units, or formed by splitting some unit(s) therein into a plurality of functionally smaller units, so as to realize the same operation without affecting the achievement of technical effects of the embodiments of the disclosure. In other words, the above units are divided on the basis of logical functions, and in practical applications, the function of one unit may also be realized by a plurality of units, or the functions of the plurality of units may be realized by one unit. Of course, in other embodiments of the disclosure, the encoder or decoder may also include other units. In practical applications, these functions may also be realized with the assistance of other units, and may be realized by cooperation of a plurality of units.

According to another embodiment of the disclosure, the encoder or decoder involved in the embodiments of the disclosure may be constructed and the encoding method or decoding method provided by the embodiments of the disclosure may be implemented by running computer programs (including program codes) capable of executing various steps involved in the corresponding methods on a general purpose computing device of a general purpose computer including a processing element and a storage element, such as a Central Processing Unit (CPU), a Random Access Storage Medium (RAM), and a Read-Only Storage Medium (ROM). The computer program may be recorded, for example, on a computer-readable storage medium, loaded on any electronic device with a processing capacity through the computer-readable storage, and run therein to implement corresponding methods of the embodiments of the disclosure. In other words, the units mentioned above may be implemented in a form of hardware, or may also be implemented through instructions in the form of software, or may be realized through a combination of hardware and software. Specifically, each step of the method embodiment in the embodiment of the present disclosure may be completed by the integrated logic circuit of hardware in the processor and/or instructions in the form of software. Steps of the methods disclosed in combination with the embodiments of the present disclosure may be directly performed and completed by a hardware decoding processor, or may be performed and completed by a combination of hardware and software in the decoding processor. Optionally, the software may be located in a mature storage medium in the art, such as a RAM, a flash memory, a ROM, a Programmable Read-Only Memory (PROM), an Electrically Erasable Programmable Memory (EEPM), and a register. The storage medium is located in the memory, and the processor reads information in the memory and completes the steps in the above method embodiments in combination with hardware.

Figure 8:
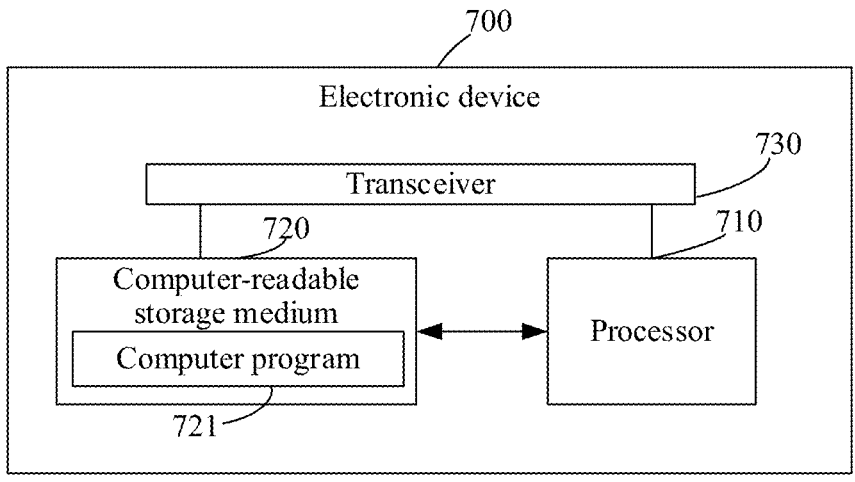
FIG. 8 is a schematic block diagram of an electronic device provided by an embodiment of the disclosure.

FIG. 8 is a schematic structural diagram of an electronic device 700 provided by an embodiment of the disclosure.

As shown in FIG. 8, the electronic device 700 includes a processor 710 and a computer-readable storage medium 720. Herein, the processor 710 and the computer-readable storage medium 720 may be connected by a bus or other modes. The computer-readable storage medium 720 is used for storing a computer program 721. The computer program 721 includes a computer instruction. The processor 710 is configured to execute the computer instruction stored in the computer-readable storage medium 720. The processor 710 is a computing core and control core of the electronic device 700, which is adapted for implementing one or more computer instructions, and specifically, adapted for loading and executing one or more computer instructions, so as to realize corresponding method processes or corresponding functions.

As an example, the processor 710 may also be referred to as a CPU. The processor 710 may be, but is not limited to, a general-purpose processor, a Digital Signal Processor (DSP), an Application Specific Integrated Circuit (ASIC), a Field Programmable Gate Array (FPGA), or another programmable logic device, a discrete gate or transistor logic device, a discrete hardware component, or the like.

As an example, the computer-readable storage medium 720 may be a high-speed RAM, or may be a non-volatile memory, for example, at least one disk memory. Optionally, the computer-readable storage medium 720 may also be at least one computer-readable storage medium far away from the foregoing processor 710. Specifically speaking, the computer-readable storage medium 720 includes, but is not limited to, a volatile memory and/or a non-volatile memory.

The non-volatile memory may be a ROM, a PROM, an EPROM, an EEPROM, or a flash memory. The volatile memory may be a RAM, which is used as an external cache. By way of exemplary rather than restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

In one implementation, the electronic device 700 may be the encoding framework 100 shown in FIG. 1 or the encoder 500 shown in FIG. 6. The computer-readable storage medium 720 stores a first computer instruction. The processor 710 loads and executes the first computer instruction stored in the computer-readable storage medium 720 to implement corresponding steps in the method embodiment in FIG. 4. During specific implementation, the first computer instruction in the computer-readable storage medium 720 is loaded by the processor 710 to perform corresponding steps, which will not be elaborated herein to avoid repetition.

In one implementation, the electronic device 700 may be the decoding framework 200 shown in FIG. 3 or the decoder 600 shown in FIG. 7. The computer-readable storage medium 720 stores a second computer instruction. The processor 710 loads and executes the second computer instruction stored in the computer-readable storage medium 720 to implement corresponding steps in the method embodiment in FIG. 5. During specific implementation, the second computer instruction in the computer-readable storage medium 720 is loaded by the processor 710 to perform corresponding steps, which will not be elaborated herein to avoid repetition.

According to another aspect of the disclosure, the embodiments of the disclosure further provide a computer-readable storage medium (memory). The computer-readable storage medium is a memory device in the electronic device 700, and is configured to store programs and data, for example, the computer-readable storage medium 720. It may be understood that the computer-readable storage medium 720 here may include both a built-in memory of the electronic device 700, and of course, an extended memory supported by the electronic device 700. The computer-readable storage medium provides storage space. The storage space stores an operating system of the electronic device 700. In addition, the storage space further stores one or more computer instructions that are suitable to be loaded and executed by the processor 710. These computer instructions may be one or more computer programs 721 (including a program code).

According to another aspect of the disclosure, a computer program product or a computer program is provided. The computer program product or the computer program includes a computer instruction. The computer instruction is stored in a computer-readable storage medium, for example, a computer program 721. At this moment, an electronic device 700 may be a computer. A processor 710 reads the computer instruction from the computer-readable storage medium 720, and the processor 710 executes the computer instruction to enable the computer device to perform the encoding method or the decoding method provided by various optional modes described above.

In other words, during implementation with the software, the encoding method or the decoding method may be implemented completely or partially in a form of a computer program product. The computer program product includes one or more computer instructions. The computer, when loading and executing computer program instructions, completely or partially runs procedures of the embodiments of the disclosure or realizes functions of the embodiments of the disclosure. The computer may be a general-purpose computer, a dedicated computer, a computer network, or other programmable apparatuses. The computer instruction may be stored in a computer-readable storage medium, or transmitted from one computer-readable storage medium to another computer-readable storage medium. For example, the computer instruction may be transmitted from one website site, computer, server or data center to another website site, computer, server or data center through wired (such as a coaxial cable, an optical fiber, a Digital Subscriber Line (DSL)) or wireless (such as infrared, wireless, microwave, and the like).

In a solution provided by the disclosure, a parameter used for characterizing the importance degree of the target point, that is, the quantization weight of the target point, is introduced in a process of predicting the attribute information of a point in the point cloud, and the predicted residual value of the target point is quantized in combination with the quantization weight of the target point and a quantization step of the target point to obtain a quantized residual value of the attribute information of the target point, and then the quantized residual value is encoded to obtain a bitstream. The quantization weight of the target point is introduced, which is equivalent to modifying the quantization step of the target point based on the quantization weight of the target point, that is, the quantization step of the target point may be adaptively adjusted according to the importance degree of the target point, and then the predicted residual value of the target point is quantized based on the adjusted quantization step. In a process of predicting the attribute information of the point in the point cloud, for the point that is in front of an encoding order, when the point is relatively important in prediction, the quantization step of the point can be prevented from being too large, thereby avoiding a large reconstruction error, which is equivalent to that the point with a relatively high quantization weight is quantized with a small quantization step to reduce the reconstruction error thereof. For a point that is in the back of the encoding order, the accuracy of predicting the point can be improved.

Those of ordinary skill in the art may be aware that the units and process steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may realize the described functions for each particular application by different methods, but it is not to be considered that the implementation is beyond the scope of the disclosure.

It is finally to be noted that the above descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

What is claimed is:

1. A method for encoding a point cloud, comprising:
processing attribute information of a target point in a point cloud to obtain a predicted residual value of the attribute information of the target point;

quantizing the predicted residual value based on a quantization weight of the target point and a quantization step of the target point to obtain a quantized residual value of the attribute information of the target point, the quantization weight of the target point being a weight used for performing weighting on the quantization step of the target point; and encoding the quantized residual value to obtain a bitstream, wherein the quantizing the predicted residual value based on a quantization weight of the target point and a quantization step of the target point to obtain a quantized residual value of the attribute information of the target point comprises:

determining an effective quantization weight of the target point based on the quantization weight of the target point; and quantizing the predicted residual value by using the effective quantization weight of the target point and the quantization step of the target point to obtain the quantized residual value.

2. The method of claim 1, wherein a value of the effective quantization weight is equal to an integer power of 2.

3. The method of claim 1, wherein a value of the effective quantization weight is not equal to an integer power of 2; and determining the effective quantization weight of the target point based on the quantization weight of the target point comprises:

determining the integer power of 2 which is the closest to the quantization weight of the target point as the effective quantization weight based on the value of the quantization weight of the target point.

4. The method of claim 1, wherein the quantizing the predicted residual value by using the effective quantization weight of the target point and the quantization step of the target point to obtain the quantized residual value comprises:

multiplying the effective quantization weight by the predicted residual value to obtain a weighted residual value; and quantizing the weighted residual value by using the quantization step of the target point to obtain the quantized residual value.

5. The method of claim 1, wherein the quantizing the predicted residual value by using the effective quantization weight of the target point and the quantization step of the target point to obtain the quantized residual value comprises:

updating the quantization step of the target point by using the following formula:

$$newQstep = \lceil Qstep/effectiveQuantWeight \rceil,$$

wherein effectiveQuantWeight represents effective quantization weight of the target point, newQstep represents the quantization step of the target point after being updated based on the effective quantization weight of the target point, and Qstep represents the quantization step of the target point before being updated based on the effective quantization weight of the target point; and quantizing the predicted residual value by using the quantization step after being updated of the target point to obtain the quantized residual value.

6. The method of claim 1, further comprising:

updating quantization weights of N nearest points of the present point based on the quantization weight of the present point by traversing points in the cloud point according to a reverse order of an encoding order of the point cloud, N being an integer greater than 0.

7. The method of claim 6, further comprising:

dividing the point cloud into one or more Level of Detail (LOD) layers, wherein each LOD layer comprises one or more points, and an initial value of the quantization weight of a point in the previous M layers of LOD of the plurality of LOD layers is greater than an initial value of the quantization weight of a point in remaining LOD layers of the plurality of LOD layers.

8. The method of claim 1, wherein the processing the attribute information of the target point in the point cloud to obtain the predicted residual value of the attribute information of the target point comprises:

processing location information of the target point to obtain reconstructed information of the location information of the target point;

obtaining a predicted value of the attribute information of the target point according to the reconstructed information of the location information of the target point;

processing the attribute information of the target point in the point cloud to obtain a true value of the attribute information of the target point; and obtaining the predicted residual value according to the predicted value of the attribute information of the target point and the true value of the attribute information of the target point.

9. A method for decoding a point cloud, comprising:

parsing a bitstream of a point cloud to obtain a quantized residual value of attribute information of a target point of the point cloud;

performing inverse quantization on the quantized residual value based on a quantization weight of the target point and a quantization step of the target point to obtain a reconstructed residual value of the attribute information of the target point, the quantization weight of the target point being a weight used for performing weighting on the quantization step of the target point;

obtaining a reconstructed value of the attribute information of the target point according to the reconstructed residual value and the predicted value of the attribute information of the target point; and obtaining a decoded point cloud according to the reconstructed value of the attribute information of the target point, wherein the performing the inverse quantization on the quantized residual value based on the quantization weight of the target point and the quantization step of the target point to obtain the reconstructed residual value of the attribute information of the target point comprises:

determining an effective quantization weight of the target point based on the quantization weight of the target point; and performing inverse quantization on the quantized residual value by using the effective quantization weight of the target point and the quantization step of the target point to obtain the reconstructed residual value.

10. The method of claim 9, wherein a value of the effective quantization weight is not equal to an integer power of 2; and the determining the effective quantization weight of the target point based on the quantization weight of the target point comprises:

determining the integer power of 2 which is the closest to the quantization weight of the target point as the effective quantization weight based on the value of the quantization weight of the target point.

11. The method of claim 9, wherein the performing the inverse quantization on the quantized residual value by using the effective quantization weight of the target point and the quantization step of the target point to obtain the reconstructed residual value comprises:

performing inverse quantization on the quantized residual value by using the quantization step of the target point to obtain a weighted residual value; and dividing the weighted residual value by the effective quantization weight to obtain the reconstructed residual value.

12. The method of claim 9, wherein the performing the inverse quantization on the quantized residual value by using the effective quantization weight of the target point and the quantization step of the target point to obtain the reconstructed residual value comprises:

updating the quantization step of the target point by using the following formula:

$$newQstep = \lceil Qstep/effectiveQuantWeight \rceil,$$

wherein effectiveQuantWeight represents effective quantization weight of the target point, newQstep represents the quantization step of the target point after being updated based on the effective quantization weight of the target point, and Qstep represents the quantization step of the target point before being updated based on the effective quantization weight of the target point; and performing inverse quantization on the quantized residual value by using the quantization step after being updated of the target point to obtain the reconstructed residual value.

13. The method of claim 9, further comprising:

updating quantization weights of N nearest points of a present point based on the quantization weight of the present point by traversing the points in the cloud point according to a reverse order of an encoding order of the point cloud, N being an integer greater than 0.

14. The method of claim 13, further comprising:

dividing the point cloud into one or more Level of Detail (LOD) layers, wherein each LOD layer comprises one or more points, and an initial value of the quantization weight of a point in the previous M layers of LOD of the one or more LOD layers is greater than an initial value of the quantization weight of a point in remaining LOD layers of the plurality of LOD layers.

15. The method of claim 13, wherein the updating the quantization weights of the N nearest points of the present point based on the quantization weight of the present point comprises:

acquiring an influence weight of the present point on each of the N nearest points, the influence weight depending on location information of the present point and the N nearest points; and updating the quantization weights of the N nearest points based on the quantization weight of the present point and the influence weight of the present point on each of the N nearest points.

16. The method of claim 9, further comprising:

parsing a bitstream to obtain reconstructed information of location information of the target point; and obtaining a predicted value of the attribute information of the target point according to the reconstructed information of the location information of the target point.

17. A point cloud encoder, comprising:

a processor and a computer-readable storage medium for storing a computer program;

wherein the processor is configured to execute the computer program to:

process attribute information of a target point in a point cloud to obtain a predicted residual value of the attribute information of the target point;

quantize the quantized residual value based on a quantization weight of the target point and a quantization step of the target point to obtain a quantized residual value of the attribute information of the target point, the quantization weight of the target point being a weight used for performing weighting on the quantization step of the target point; and encode the quantized residual value to obtain a bitstream, wherein the processor is further configured to execute the computer program to:

determine an effective quantization weight of the target point based on the quantization weight of the target point; and quantize the predicted residual value by using the effective quantization weight of the target point and the quantization step of the target point to obtain the quantized residual value.

18. A point cloud decoder, comprising:

a processor and a computer-readable storage medium for storing a computer program;

wherein the processor is configured to execute the computer program to implement the method of claim 9.

* * * * *